(12) United States Patent
Seeley

(10) Patent No.: US 11,371,893 B2
(45) Date of Patent: Jun. 28, 2022

(54) OPTICAL SENSOR AND SYSTEMS AND METHODS

(71) Applicant: Ryan Seeley, North Logan, UT (US)

(72) Inventor: Ryan Seeley, North Logan, UT (US)

(73) Assignee: Ryan Seeley, North Logan, UT (US)

( * ) Notice: Subject to any disclaimer, the term of this patent is extended or adjusted under 35 U.S.C. 154(b) by 325 days.

(21) Appl. No.: 16/349,204

(22) PCT Filed: Nov. 10, 2017

(86) PCT No.: PCT/US2017/061156
§ 371 (c)(1),
(2) Date: May 10, 2019

(87) PCT Pub. No.: WO2018/089831
PCT Pub. Date: May 17, 2018

(65) Prior Publication Data
US 2019/0285487 A1    Sep. 19, 2019

Related U.S. Application Data

(60) Provisional application No. 62/420,455, filed on Nov. 10, 2016.

(51) Int. Cl.
*G01K 11/3206*    (2021.01)
*G01L 1/24*    (2006.01)

(52) U.S. Cl.
CPC .......... *G01K 11/3206* (2013.01); *G01L 1/246* (2013.01)

(58) Field of Classification Search
CPC ............................ G01L 1/246; G01K 11/3206
USPC .......................................................... 73/800
See application file for complete search history.

(56) References Cited

U.S. PATENT DOCUMENTS

| | | | |
|---|---|---|---|
| 4,726,676 A * | 2/1988 | Maslaney | G01N 21/59 356/73.1 |
| 5,798,521 A | 8/1998 | Froggatt | |
| 6,024,488 A | 2/2000 | Wu et al. | |
| 2001/0030281 A1 | 10/2001 | Schulz et al. | |
| 2004/0067003 A1* | 4/2004 | Chliaguine | G01M 3/047 385/13 |
| 2005/0111793 A1 | 5/2005 | Grattan et al. | |
| 2007/0156019 A1 | 7/2007 | Larkin et al. | |
| 2009/0123111 A1 | 5/2009 | Udd | |
| 2010/0259752 A1 | 10/2010 | Shah et al. | |
| 2012/0103066 A1 | 5/2012 | Xia et al. | |
| 2013/0070235 A1* | 3/2013 | Chen | G01L 11/025 356/73 |

(Continued)

OTHER PUBLICATIONS

International Search Report for International Application No. PCT/US17/061156, dated Feb. 26, 2018, 4 pages.

(Continued)

*Primary Examiner* — Octavia Hollington
(74) *Attorney, Agent, or Firm* — TraskBritt

(57) ABSTRACT

The various embodiments described here comprise an OFDR system and technique that may be used for inference of strain or temperature over a large dynamic range using a narrow wavelength range. Embodiments of the sensor fiber may be composed of one or more multi-spectral-feature sensors, each sensor exhibiting several spectral features that together offer coverage over a wavelength range corresponding to the desired system strain and or temperature dynamic range.

25 Claims, 15 Drawing Sheets

(56) References Cited

U.S. PATENT DOCUMENTS

| 2015/0204748 A1* | 7/2015 | Carr | G01H 9/004 |
| | | | 356/519 |
| 2015/0285683 A1* | 10/2015 | Ouellette | G01D 5/35354 |
| | | | 356/451 |
| 2016/0245643 A1 | 8/2016 | Mori | |

OTHER PUBLICATIONS

International Written Opinion for International Application No. PCT/US17/061156, dated Feb. 26, 2018, 5 pages.

\* cited by examiner

OPTICAL SENSOR AND SYSTEMS AND METHODS

PRIORITY CLAIM

This application is a national phase entry under 35 U.S.C. § 371 of International Patent Application PCT/US2017/061156, filed Nov. 10, 2017, designating the United States of America and published in English as International Patent Publication WO 2018/089841 A1 on May 17, 2018, which claims the benefit of the filing date under Article 8 of the Patent Cooperation Treaty to U.S. Provisional Patent Application Ser. No. 62/420,455, filed Nov. 10, 2016, for "OPTICAL SENSOR AND SYSTEMS AND METHODS FOR USING THE SAME," the entire contents and disclosure of each of which are hereby incorporated by this reference.

TECHNICAL FIELD

Embodiments of this disclosure relate generally to optical sensors. In particular, various embodiments of this disclosure relate to an optical frequency domain reflectometry (OFDR) system and methods to perform distributed or quasi-distributed sensing of strain, temperature, and or other effects that may be transduced to strain and or temperature along a sensing fiber.

BACKGROUND

Conventional optical sensors use an optical fiber to sense strain (e.g., compression and tension), temperature, and or other effects along an object of interest. Strain and temperature at the object translate to physical changes at the sensing fiber that may be identified and measured by the optical sensor. Such optical sensors are used to measure and characterize the device under test (DUT) under stress as well as actively monitor them during operation. For example, optical sensors are used to test and characterize airframes, civil infrastructure, medical equipment, machinery, etc., as well as monitor them during operation.

OFDR-based sensor systems are typically used for applications in which high spatial resolution (e.g., on the order of millimeters) is of key interest. Indeed, using a wide wavelength sweep range it is possible to differentiate response within an optical fiber on the scale of tens of microns over tens of meters of fiber. Conventional OFDR systems suffer from key limitations related to interdependencies between strain (or temperature) dynamic range of the system, system update (e.g., sample) rate, and sensing length. These interdependencies result in a sensing technology that exhibits fundamental limits on these key system characteristics of interest (i.e., sensing length, system update/sample rate, and or dynamic range).

For example, assume that the strain dynamic range of the system is fixed and an increased sensing length is desired. In conventional OFDR systems, the strain (or temperature) dynamic range is proportional to the required wavelength range that will be demodulated. For a given signal bandwidth, the length of sensing fiber that may be interrogated is inversely proportional to the sweep speed of the light source. Thus, if an increased sensing length is required, the sweep speed must be decreased. Consequently, for a fixed wavelength range (fixed strain or temperature dynamic range), the system sample rate will decrease because more time will be required per sweep in order for the swept-wavelength light source to sweep the given wavelength range at a lower speed. Similarly, if the system sample rate is increased, for a fixed wavelength range the sweep speed will increase and so the sensing length will decrease.

In a second example, assume that the system sample rate is fixed and an increased sensing length is desired. Since the time period over which the wavelength sweep must be performed is fixed (due to the fixed system sample rate, the inverse of which defines the sweep time period), and since an increased sensing length requires a slower sweep speed, the wavelength range and therefore strain dynamic range will decrease. Alternatively, if it is desired to increase the strain dynamic range, the sensing length will decrease.

In a third example, assume that the sensing length is fixed and an increase in system update rate is desired. An increase in system update rate means there is less time to perform the wavelength sweep. The fixed sensing length, however, requires that the sweep speed also be fixed. Thus, the wavelength range and therefore the strain (or temperature) dynamic range will decrease. Similarly, if the strain dynamic range is increased, the system update rate will decrease.

One option for narrowing the wavelength sweep range is to use entirely-overlapped single-frequency fiber Bragg gratings (FBGs) with specific combinations of wavelength spacing between spectral peaks and/or specific patterns of reflection amplitude being exhibited by the individual overlapped gratings. The individual single-frequency FBGs yielding the multi-wavelength spectral response are completely overlapped; the specific patterns of wavelength spacing and/or reflection amplitude may be used to unambiguously identify which spectral lobes lie outside the narrow wavelength sweep (i.e., which are not included in the narrow wavelength sweep).

BRIEF SUMMARY

It is now understood that there are disadvantages to using entirely-overlapped single-frequency fiber Bragg gratings (FBGs) with specific combinations of wavelength spacing between spectral peaks and/or specific patterns of reflection amplitude being exhibited by the individual overlapped gratings. More specifically, the "entirely-overlapped" FBG technique exhibits a reduced wavelength range that must necessarily include three or more reflection peaks in order to unambiguously identify which overlapping FBG belongs to which reflection peak. This is especially the case where there are many overlapping FBGs in one sensor.

Some overlapped FBG systems have introduced specific modifications to reflectance amplitude of the individual overlapped FBGs to characterize the reflection peaks. In addition to adding complexity to the grating fabrication process, the entirely-overlapped FBGs also exhibit greater wavelength spacing (and greater resultant narrow wavelength range) than would otherwise be required since the wavelength spacing must ensure that low-reflectance wavelength peaks may be correctly resolved in the presence of high-reflectance peaks. Other overlapped FBG systems rely on specific patterns of wavelength spacing between neighboring spectral response of overlapped FBGs. This necessarily increases the maximum wavelength spacing between spectrally-neighboring grating center wavelengths and thus increases the minimum narrow wavelength range required to unambiguously identify which spectral-domain peaks are not included within the narrow wavelength range.

Further, it is also now understood that conventional OFDR systems, including the overlapped FBGs, that use a spectrogram calculation may exhibit reduced delay-domain resolution along the sensing fiber. Significant local strain gradients over a spatial scale on the order of the delay-domain resolution will result in broadening of spectral-domain reflection peaks. Since it is not possible to otherwise isolate the individual spectral-domain response resulting from each of the overlapped gratings, the wavelength spacing between center wavelengths of the overlapped FBGs needs to be increased in order to differentiate the broadened peaks. This in turn results in a wider reduced wavelength range than would otherwise be required.

FIGS. 4, 5 and 6 illustrate response of conventional OFDR systems that exhibit a single response peak. Notably, the peak might move up or down in wavelength as a sensor undergoes tension or compression.

Various embodiments of the disclosure are OFDR systems and related techniques for optical sensors and interrogators that facilitate inference of strain or temperature over a given dynamic range using narrow wavelength sweeps.

The various embodiments of sensors described in the present disclosure exhibit several spectral features that together offer coverage of a wavelength range corresponding to the desired strain dynamic range (or temperature range) of the system. The spectral features arise from particular regions of the fiber and may be differentiated via their absolute or relative time-of-flight (or spatial) lengths and or positions within the optical fiber. In various embodiments, sensors are described that comprise grating segments that may form a multi-grating unit, each located at specific absolute or relative locations along a sensing fiber and each exhibiting a spectral response at differing wavelengths across a wide wavelength range corresponding to the desired strain (and or temperature) dynamic range. From the various embodiments of the systems and methods described herein, one may infer the complete strain and/or temperature profile over a dynamic range not normally obtainable with a small wavelength range.

Those of ordinary skill in the art will understand that the invention is scalable and may be applied to narrower ranges than those described in connection with the embodiments of the present disclosure. Depending on the application, the invention may be applied at wavelength ranges orders of magnitude narrower than what is specifically described.

Definitions

"Time domain" refers to the domain in which samples are acquired via a data acquisition subsystem (i.e., the domain according to the standard definition of time in the sciences).

"Spectral domain" is a wavelength domain (or optical frequency domain). If a light source sweeps linearly in wavelength (or optical frequency), then the time domain and wavelength (optical frequency) domains are equivalent.

"Delay domain" is a transform-domain with respect to the spectral domain. In OFDR, a Fourier transform moves the spectral domain to the delay domain—i.e., moves the data to a domain in which response is ordered according to optical time-of-flight delay (proportional to length) along the fiber.

"$\Delta t$" refers to system time resolution (i.e., the time that elapses between system scans, or equivalently between updates of engineering values along the fiber). The inverse of the system sample rate.

"$\Delta \varepsilon$" refers to strain dynamic range specification of the system.

"$\Delta \lambda$" is the wavelength range needed to accommodate the strain dynamic range $\Delta \varepsilon$ in a conventional OFDR system.

"$\overline{\Delta \lambda}$" refers to the reduced (narrower) wavelength range required to accommodate the strain dynamic range $\Delta \varepsilon$ when the present system and technique are utilized.

"$\Delta \lambda_{ij}$" refers to the wavelength spacing between the i-th and j-th spectral feature center wavelengths for a given multi-segment sensor. Note for the sake of clarity that spectral features are numbered incrementally herein with increasing wavelength starting at index 1.

"$\widehat{\Delta \lambda}$" is the maximum wavelength spacing between any two wavelength-adjacent spectral features.

"$\bar{\alpha}\lambda$" refers to the full-width at half maximum (FWHM) of a spectral feature in the wavelength domain.

"$\delta \lambda$" is the wavelength resolution of acquired data in the spectral domain.

"$L_{sens}$" refers to the length of a single multi-spectral-feature sensor.

"$\Delta L_{sens}$" refers to center-to-center spacing between neighboring multi-spectral-feature sensors.

"N" is the number of segments in a multi-segment sensor.

"$\Delta L_{seg}$" is the length of each segment within a multi-segment sensor.

"$\Delta L_{seg}$" is the center-to-center spacing of segments within a multi-segment sensor.

DETAILED DESCRIPTION

Figure 1:
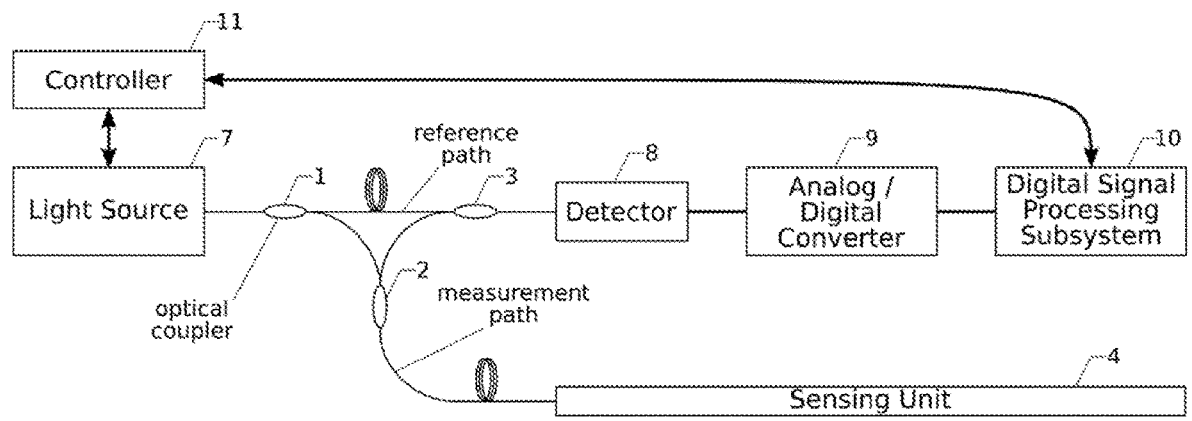
FIG. 1: OFDR system consisting of light source, optical fiber network composed of reference and measurement paths, sensing unit, detector, analog-digital converter, DSP subsystem, and system controller. Optical fiber is represented by thin lines whereas electrical signals are represented by thicker lines. Fiber spools represented by the coils in the reference path and or measurement path are optional and are meant to indicate that the lengths of the reference path and measurement path are adjustable.
Figure 2:
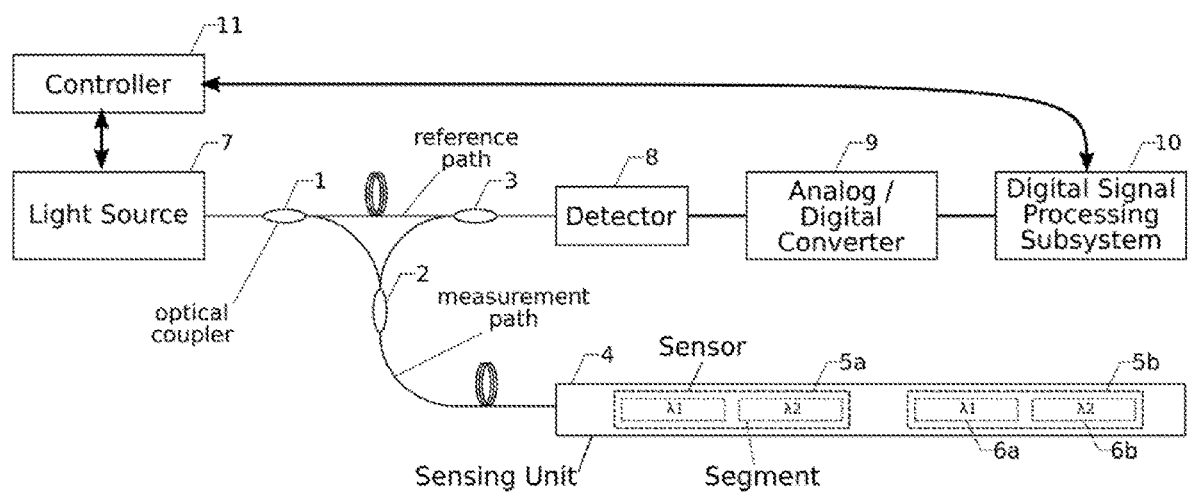
FIG. 2: The OFDR system depicted in FIG. 1 showing additional detail in the sensing unit. Here, the sensing unit is seen to consist of sensors which in turn consist of sensor segments. Each sensor segment within a sensor exhibits a spectral feature with a unique center wavelength (e.g., $\lambda_1$, $\lambda_2$). In this view, the sensor center-to-center spacing is greater than the sensor length; in addition, the segment center-to-center spacing is greater than the segment length.
Figure 3:
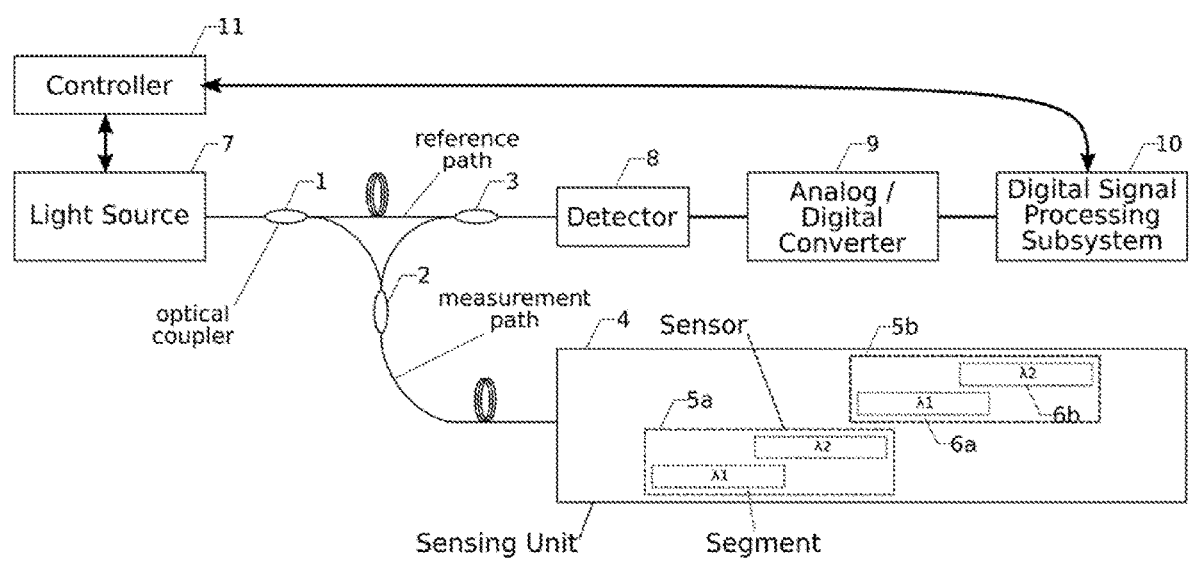
FIG. 3: The OFDR system depicted in FIG. 1 showing additional detail in the sensing unit. Here, the sensing unit is seen to consist of sensors which in turn consist of sensor segments. Each sensor segment within a sensor exhibits a spectral feature with a unique center wavelength (e.g., $\lambda_1$, $\lambda_2$). In this view, the sensor center-to-center spacing is smaller than the sensor length; in addition, the segment center-to-center spacing is smaller than the segment length. It is understood that the sensors and segments may be co-located within a single optical fiber core.
Figure 4:
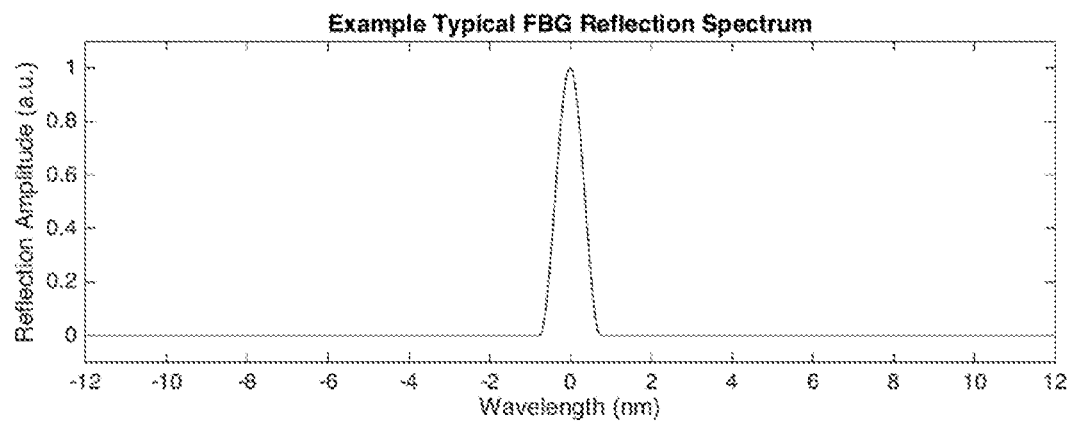
FIG. 4: Example of a conventional FBG reflection spectrum as a function of wavelength detuning from nominal. The FWHM of the grating is consistent with an approximately 1 mm length grating.

The various embodiments described here comprise an OFDR system and technique that may be used for inference of strain or temperature over a large dynamic range using a narrow wavelength range. Embodiments of the sensor fiber may be composed of one or more multi-spectral-feature sensors, each sensor exhibiting several spectral features that together offer coverage over a wavelength range corresponding to the desired system strain and or temperature dynamic range. A spectral feature is a feature of functional form (e.g., a lobe, a peak, a trough, or other functional form) discernible in the spectral domain. Embodiments of the disclosure may comprise a number of multi-spectral-feature sensors including sensors comprised of multiple single-frequency (or substantially single-frequency) FBGs.

The spectral features arise from grating segments located at particular regions of the fiber and may be differentiated via the absolute or relative time-of-flight (or spatial) lengths and or positions of the grating segments within the optical fiber. In some embodiments, the relative center wavelength of the spectral response of two spectrally-neighboring spectral features is also used for differentiation of the spectral features. This information allows for unambiguous identification of the nominal center wavelength of each spectral feature covered by the narrow wavelength range. The resulting strain (or temperature) profile of the fiber may be inferred via knowledge of the current center wavelength and nominal center wavelength of each spectral feature covered by the narrow wavelength range (i.e., the wavelength shift between nominal and current conditions).

Thus, various embodiments described herein, may be described as "multi-segment" referring to grating segments that exhibit differentiable spectral responses, or having "multiple" spectral features referring to sensors or sub-sensors that are characterized by the differentiable spectral features they exhibit.

Various embodiments of the disclosure described herein may significantly relax one of the fundamental interdependencies inherent in conventional OFDR. Specifically, the interdependency between strain and or temperature dynamic range and required wavelength range needed to accommodate the strain and or temperature dynamic range. According to the embodiments described herein, a wide dynamic range may be accommodated while utilizing a narrow wavelength range.

Consequently, sweep time for a given sensing length may decrease relative to a conventional OFDR system (given the narrow wavelength range at a given sweep speed), leading to a proportionately increased system sample rate and associated enhanced system capability. Another consequence of the decreased sweep time is a decrease in overall internal data samples that must be acquired, resulting in relaxation of overall digital signal processing requirements within the system, thus leading to potential utilization of less expensive digital signal processing hardware in the system and consequent decreased system cost.

On the other hand, for a given system update rate, sweep speed may decrease relative to a conventional OFDR system (given a fixed sweep time but reduced required sweep range), thus leading to either a proportionate increase in sensing length for a given acquisition sample rate, or to a decrease in maximum required OFDR frequency to be demodulated. In the former case, the system exhibits enhanced capability. In the latter case, less expensive acquisition hardware operating at a slower sample rate may then be employed in the system, leading to decreased overall system cost.

Embodiments of the optical sensors described herein and systems that incorporate them offer a narrower wavelength range to accommodate a given strain and or temperature dynamic range than prior art sensors that utilize OFDR-based systems and techniques. Regardless of the number of spectral features per sensor, the sensors employing the embodiments of the methods described herein may unambiguously differentiate the spectral features and infer the nominal center wavelengths of the features using only two spectral features covered by the reduced sweep range. Further, the various embodiments of the methods described herein do not require specific varied wavelength spacing between spectral features or specific reflectance amplitudes of the spectral features, thus, facilitating a narrower wavelength range and/or enhanced ease of fabrication of the sensors. Further still, various embodiments of the disclosure described herein facilitate isolation (via digital signal processing) of the response of each feature within a multi-spectral-feature sensor given coverage by the narrow wavelength range, such that the response of each component within a given sensor may be independently considered and analyzed. Such isolation of individual spectral responses facilitates peak centers to be very close (or indeed responses that overlap or cross over each other) without loss of analysis capability of each individual spectral response. Interference of neighboring spectral features on the feature of interest is reduced or eliminated, and may facilitate higher fidelity measurements.

Furthermore, digital signal processing steps required to absolutely identify the nominal wavelength of the spectral features may be reduced to a set of simple operations amenable to high-speed processing and further improved system sample rates.

FIG. 1 illustrates an OFDR optical sensing system according to the various embodiments of the disclosure described herein. The system includes a light source, optical fiber network consisting of a reference path and a measurement path, a sensing unit, a detector, an analog-digital converter (ADC), a digital signal processing (DSP) subsystem, and a system controller. Note that FIG. 1 illustrates a non-limiting example embodiment of an OFDR system and other arrangements are specifically contemplated. For example, other embodiments might include optical components such as isolators, polarization controllers, polarization beam splitters, circulators, etc. The function of these components might include, e.g., suppression of back-reflected light from entering the light source, polarization diverse reception of interfered reference and measurement light, improved power efficiency, etc.

In some embodiments the light source may be a swept-wavelength continuous-wave (CW) laser. A system controller 11 may control the light source such that the light source sweeps roughly linear in optical frequency (or wavelength) to cover the predetermined wavelength range. The light output from the optical source is split via an optical coupler 1 into two paths, a reference path and a measurement path. Light travels along the reference path until it is combined with light from the measurement path in another optical coupler 3. Light also travels along a measurement path through an optical coupler 2, along the sensing unit where a portion of it is reflected at various points along the sensing unit, a portion of the light returning from the sensing unit entering optical coupler 2 and passing on to optical coupler 3. Reference and measurement light interferes in optical coupler 3. The intensity of the interference beat pattern is measured by the optical detector and converted into an electrical signal. This electrical signal is then converted to a digital representation via an analog to digital converter suitable for signal processing in a DSP subsystem. The system controller may be a programmed computer with CPU, FPGA, Microcontroller, ASIC, other integrated circuit, or combinations thereof that operates according to logic. The system controller may receive the results of the signal processing operations and, according to its logic, may make modifications to the laser sweep range, speed, etc.

The swept-wavelength light source carries out a sweep linear in optical frequency from a start optical frequency (or start wavelength) to a destination optical frequency (or destination wavelength). The range between the start optical frequency (or wavelength) and destination optical frequency (or wavelength) is the wavelength range used to interrogate the sensing unit. In conventional OFDR, this wavelength range $\Delta\lambda$ is proportional to the desired strain dynamic range $\Delta\varepsilon$ and or temperature dynamic range $\Delta T$.

In various embodiments of the disclosure the sensing unit is a sensing fiber composed of one or more fiber Bragg gratings (FBGs) located along the sensing fiber. Various embodiments for layout and features of the fiber Bragg gratings of the sensing unit are described below.

The spectral shift of the center wavelength of the reflection spectral response of each FBG is related to the Bragg wavelength $\lambda_B$, which is in turn related to the period of refractive index modulation of the grating $\Lambda_B$ as follows:

$$\lambda_B = 2n\Lambda_B$$

where n is the effective refractive index of the fiber. As the sensing fiber experiences strain or temperature fluctuation, a spectral shift due to this strain or thermal perturbation may be given by:

$$\Delta\lambda_B = \lambda_B(K_\varepsilon \cdot \varepsilon + K_T \cdot \Delta T)$$

where $K_\varepsilon$ is the coefficient of strain and $K_T$ is the coefficient of temperature (where $K_T$ is in turn composed of the thermal expansion coefficient of the optical fiber and the thermo-optic coefficient). To accommodate a given strain and or temperature range, a corresponding wavelength range may be determined based on the desired strain and or temperature range, the appropriate coefficients, and the Bragg wavelength. The optical frequency (or wavelength) of the optical source may be swept in order to cover this wavelength range, the resulting interference beat pattern transduced by the optical detector to an electrical signal which may subsequently be converted from an analog to a digital representation suitable for processing via a digital signal processing subsystem.

Discussion herein mentioning either strain or temperature sensing may thus be taken to interchangeably mean strain sensing or temperature sensing, regardless of which term is used, since the fundamental spectral shift of a fiber Bragg grating is proportional to either a strain or a temperature perturbation. Similarly, strain and or temperature sensing may be extended to other forms of sensing in which the effect in question is transduced to either strain, temperature, or a combination of the two. Examples of effects that may be transduced to strain and or temperature include but are not limited to pressure, shear, load, bend, shape, chemical composition, liquid level, etc.

If the light source is swept linear in optical frequency, the differential delays between the reference and measurement paths sets up an interference beat pattern having frequencies proportional to the time-of-flight delay difference between reference and measurement paths. That is, the spectral response of each delay difference (or corresponding location according to optical time-of-flight) along the sensing fiber is encoded in the amplitude and phase of the resultant interference signal, the response at each location being modulated by a frequency proportional to the time-of-flight difference between measurement and reference optical paths.

In one embodiment of the disclosure, a sensing fiber is used that includes one or more multi-spectral-feature sensors, each sensor exhibiting several spectral features spaced over the desired wavelength range corresponding with the desired dynamic strain and or temperature range of the interrogator. Here, there are several spectral features (in this non-limiting example, the spectral features are reflection peaks) returned from each sensor. The features move up or down in wavelength together, the shifts in center wavelength of the lobes are proportional to the tension or compression acting on the given sensor and additionally proportional to the nominal center wavelength of each spectral feature.

The shape, amplitude, and spacing of the spectral features need not exactly match that shown in the figures; responses illustrated in the figures are merely a non-limiting example of a spectral response with several features spaced across the total wavelength range corresponding to the desired dynamic range of the system.

Figure 7:
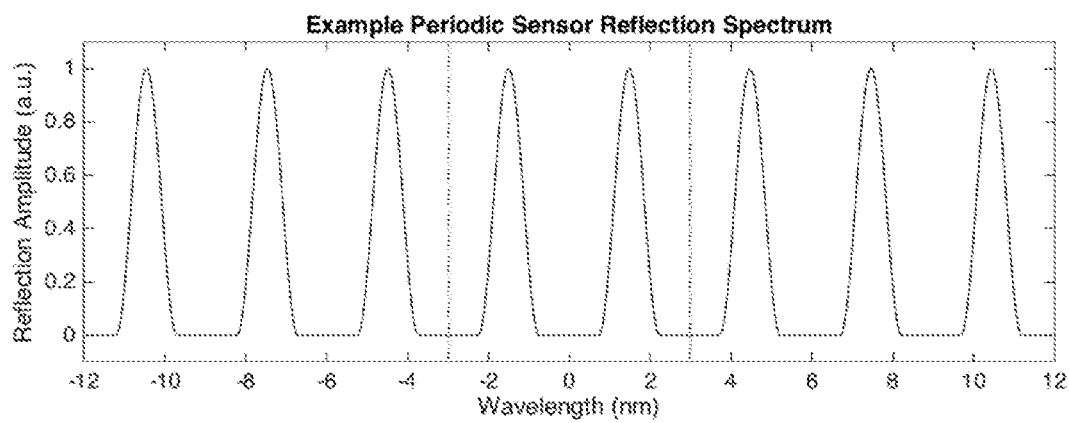
FIG. 7: Example periodic reflection spectrum of a sensor exhibiting several spectral features over the desired wavelength range corresponding with the desired dynamic strain (or temperature) range of the interrogator. This is an example view only; spectral feature shape, spacing, and relative amplitudes may be different from that shown in the graph. The dotted vertical lines show an example narrow wavelength range that may be used for demodulation when such a multi-spectral-feature sensor is used.

Various embodiments of the OFDR sensor described herein utilize a narrow wavelength sweep range when interrogating the optical fiber having one or more multi-spectral-feature sensors distributed along its length. An example of a wavelength range achievable by embodiments of the disclosure is depicted in FIG. 7 as two vertical dotted lines on either side of the two lobes in the center of the reflection spectrum. In this example, the wavelength range is about ¼ of the wavelength range that corresponds to the desired dynamic range. This example is non-limiting—the wavelength range for spectral features that is achievable by embodiments of the disclosure is scalable and may be orders of magnitude narrower than the wavelength corresponding to a desired dynamic range. The wavelength range is understood to be of a specified width and center wavelength; the center wavelength or width may be fixed or may vary scan to scan.

One or several such sensors (i.e., having spectral response similar to that shown in FIG. 7) are placed sequentially in a sensing fiber and the entire sensing fiber is interrogated by the OFDR optical sensing system shown in FIG. 1. The light source is swept in optical frequency (or wavelength) and the intensity of the interference beat pattern as a function of time is recorded by an ADC. DSP Subsystem may be configured to Fourier-transform the resultant digital signal such that a delay-domain representation of the fiber is generated (resulting in complex reflectance versus time-of-flight delay down the fiber).

Figure 5:
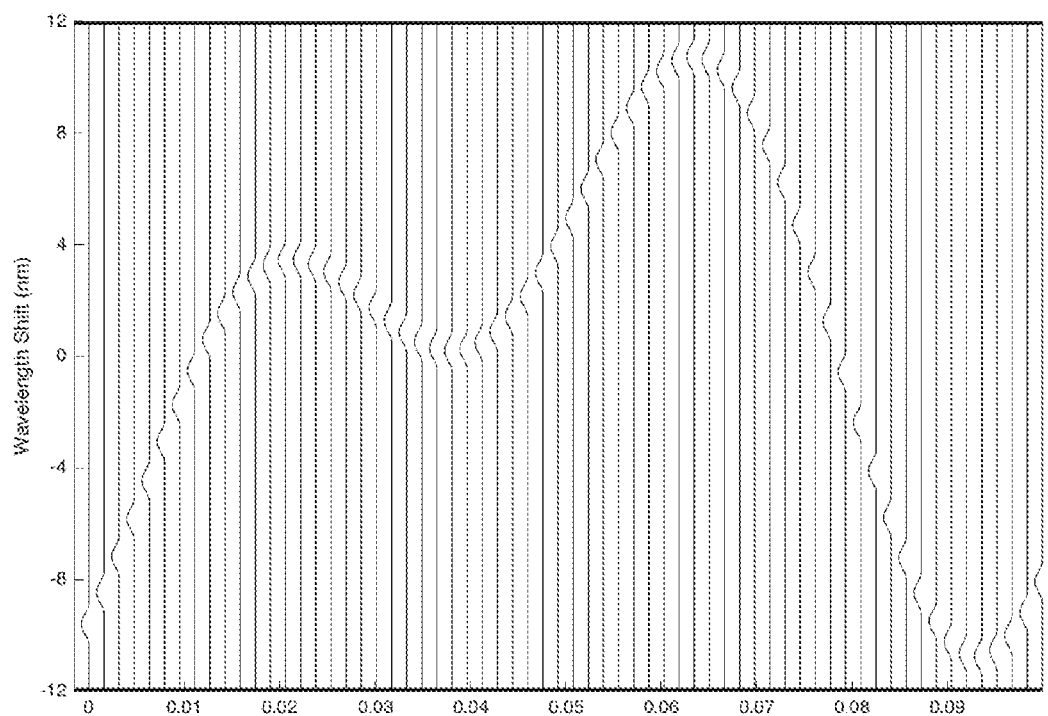
FIG. 5: Evolution of center wavelength of the spectral feature shown in FIG. 4 over time due to time-varying strain imparted on the sensor.
Figure 6:
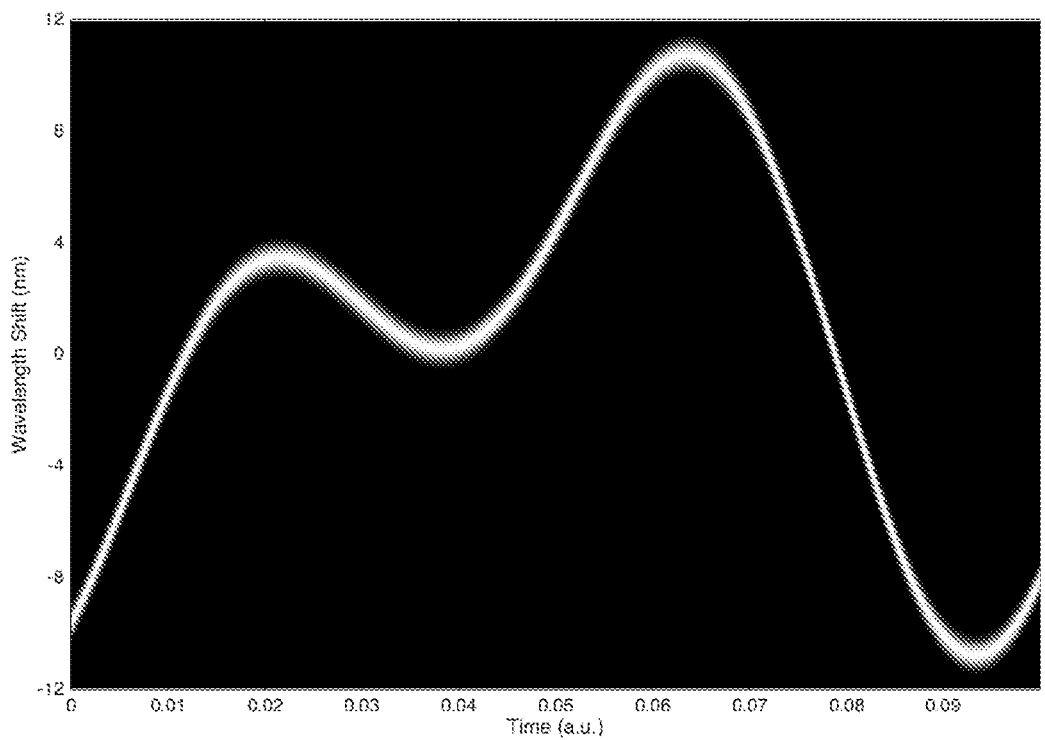
FIG. 6: Response corresponding to that shown in FIG. 5 with increased time resolution. Spectral response is encoded in grayscale where black is zero and white is maximum response.
Figure 8:
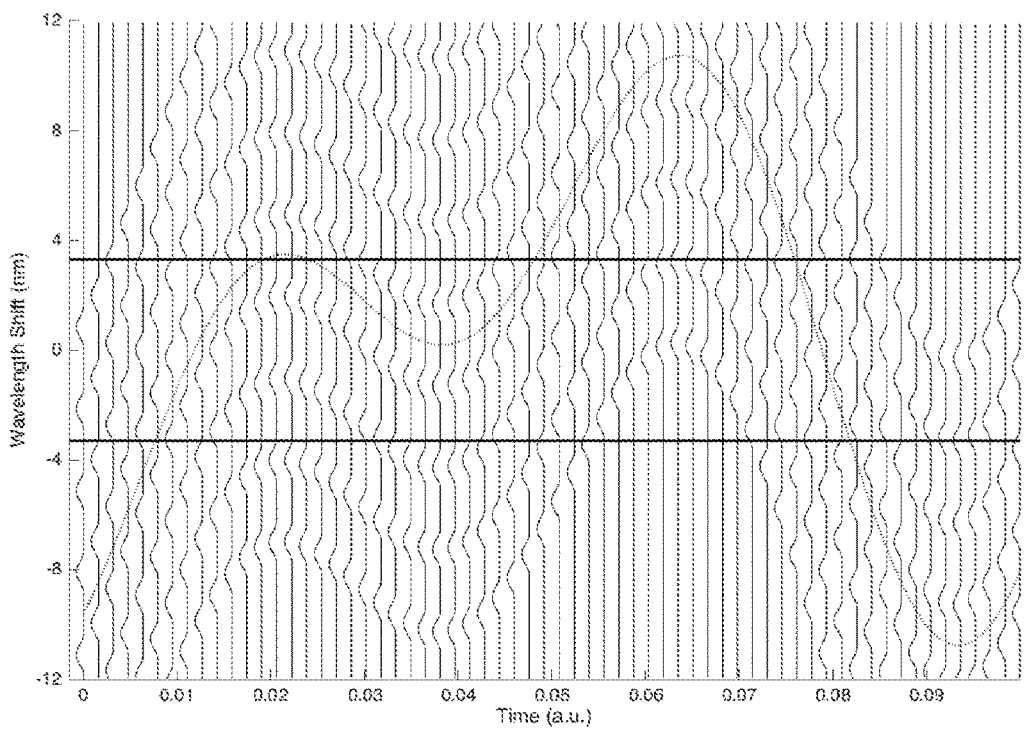
FIG. 8: Evolution of center wavelengths of the spectral features shown in FIG. 7 over time due to time-varying strain imparted on the sensor. The dotted line shows the wavelength shift from nominal due to strain evolution over time. The solid horizontal lines show an example narrow wavelength range that may be used for demodulation when such a multi-spectral-feature sensor is used.

In one embodiment, each multi-spectral-feature sensor is individually windowed and inverse transformed. FIG. 8 shows the time-evolution of the response of a single multi-spectral-feature sensor undergoing a similar strain vs time perturbation as that resulting in the response shown in FIG. 5. Here, as shown in FIG. 7, we see several lobes at each time slice, each moving proportionately and in response to the strain imparted on the sensor. Note that the reduced sweep range (depicted in FIG. 7 as vertical dotted lines) is now depicted in FIG. 8 as solid horizontal lines. The narrow wavelength range is sufficient to recover the entire signal as long as there is always one spectral feature (or a portion thereof) within the reduced sweep range. That is, there is sufficient information within the reduced sweep range to completely recover the shift in wavelength over the course of the strain evolution, as long as a spectral feature within the narrow wavelength range may be properly indexed (i.e., unambiguously identified) such that its nominal wavelength is known.

Figure 9:
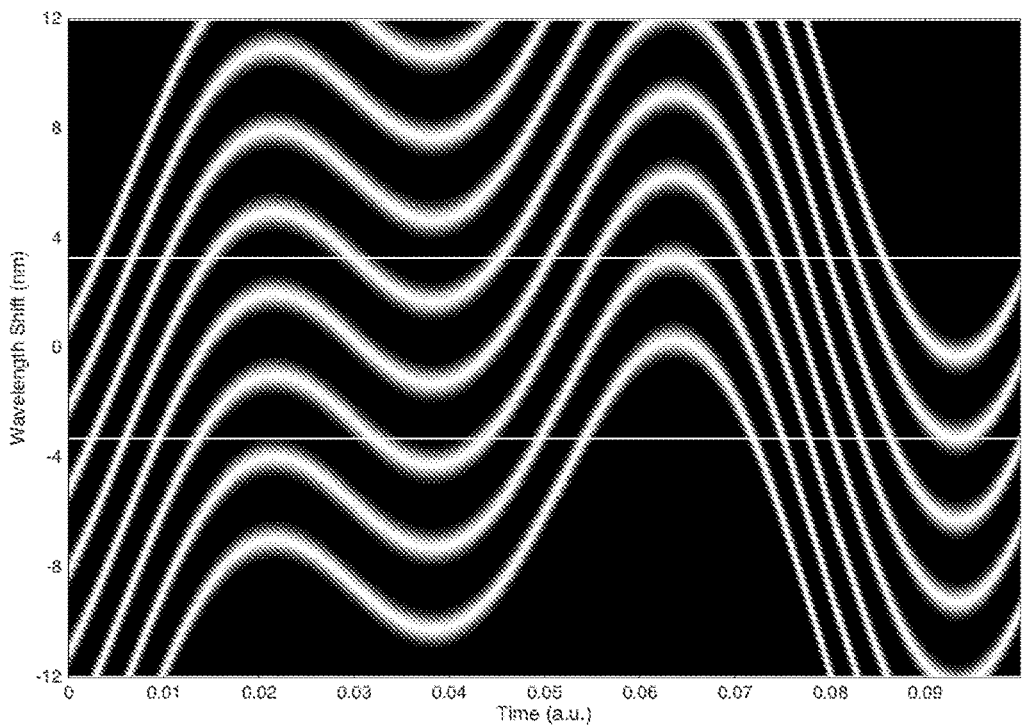
FIG. 9: Response corresponding to that shown in FIG. 8 with increased time resolution. Spectral response is encoded in grayscale where black is zero and white is maximum response. Horizontal white lines indicate the extents of the narrow wavelength range.

FIG. 9 illustrates the same response as shown in FIG. 8 but with a much finer time resolution. In this plot, the spectral response is shown in grayscale, with minimum amplitude denoted by black and maximum by white, and the reduced sweep range is shown by horizontal white lines.

We denote the wide sweep range (typical of conventional OFDR) as $\Delta\lambda$ (i.e., the range required to recover the response over a strain dynamic range $\Delta\varepsilon$ and or temperature range $\Delta T$ using conventional OFDR techniques), the reduced (narrow) sweep range as $\overline{\Delta\lambda}$, the maximum wavelength spacing between spectrally-neighboring lobes of the multi-wavelength spectral response (of the sensor exhibiting such a response) as $\widehat{\Delta\lambda}$, and the maximum FWHM of any lobe of the multi-wavelength spectral response as $\widetilde{\Delta\lambda}$. If we define the narrow sweep range such that $\overline{\Delta\lambda} > 2\widehat{\Delta\lambda}$, then there will always be sufficient information (i.e., two spectral features) in a scan to recover the entire strain response across the wide strain dynamic range $\Delta\varepsilon$ (and or temperature range $\Delta T$). If the spectral features are spaced evenly across the wide range $\Delta\lambda$, then if there are N spectral features the relationship between narrow and wide wavelength range required to accommodate the desired dynamic range ($\Delta\varepsilon$ and or $\Delta T$) is $\overline{\Delta\lambda} = 2\Delta\lambda/N$.

Note that if the multi-wavelength spectral features of a sensor cover a sufficiently wide wavelength range (i.e., wider than that corresponding to the desired dynamic range ($\Delta\varepsilon$ and or $\Delta T$)), the sweep range may be several times wider than $\widehat{\Delta\lambda}$. In this case, a new set of output strain values may be inferred (during any given individual wide laser sweep over $\Delta\lambda$) every time the laser sweeps through a sweep range $\widehat{\Delta\lambda}$. Thus, by keeping the sweep range at $\Delta\lambda$ and generating a new set of strain output each time $\widehat{\Delta\lambda}$ is traversed, the system sample rate may similarly be increased or the maximum required demodulated frequency be decreased.

There are several types of multi-spectral-feature sensors that may be manufactured to have multiple spectral features across a range, all of which having center wavelengths that move in proportion to strain applied on the sensor. One example is a multi-segment FBG sensor, in which each sensor comprises several shorter single-frequency FBGs at differing wavelengths across the range.

The example mentioned above, that of a multi-spectral-feature sensor comprising multiple FBG segments (termed herein "multi-segment sensors"), will now be described in more detail.

1.1 Embodiment 1: Multi-Segment Sensor

Figure 10:
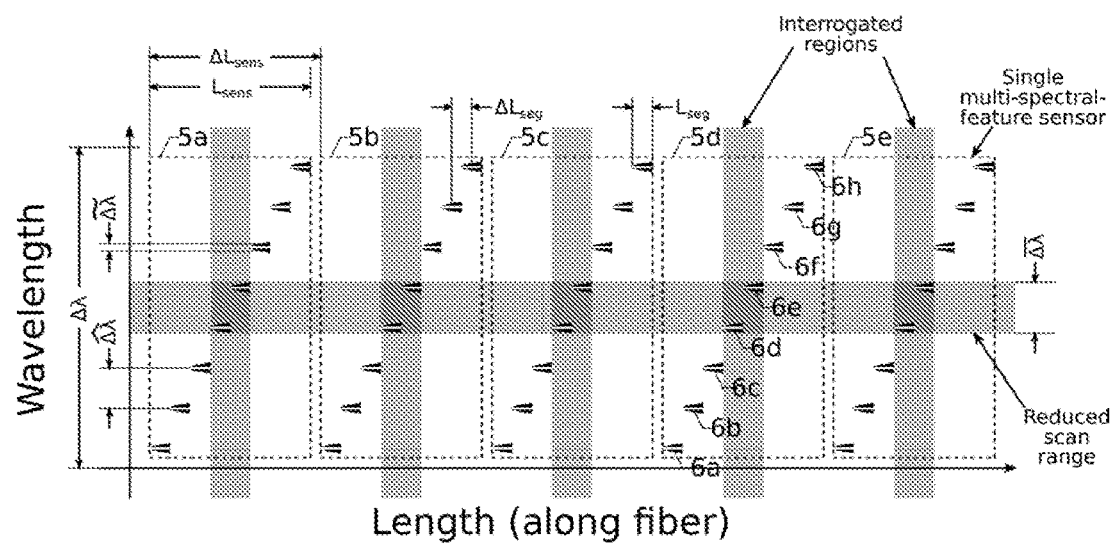
FIG. 10: Multi-segment sensors. This view portrays the spectral (wavelength) response arising from each segment along the fiber. Individual multi-segment sensors are shown by dotted-line boxes. Also shown are gray bars representing the reduced-wavelength sweep range (horizontal bar), and the region of fiber interrogated by this reduced sweep range (vertical bars). The original wide-wavelength sweep range is the positive vertical extent (shown in the figure) of the y-axis.

In a first embodiment of the disclosure, the sensing fiber, shown in FIG. 1 as sensing unit 4, consists of one or more multi-spectral-feature sensors 5a-5e (see, e.g., FIG. 10). Each sensor 5a-5e consists of several shorter (shorter in terms of the length of the specific sensor) segments 6a-6h (see, e.g., FIG. 10) that are FBGs written in the optical fiber, where several of these shorter FBGs compose one functional sensor that exhibits several spectral features over a wavelength range. For ease of illustration only segments 6a-6h in sensor 5d are labeled and are described, and that practice is carried through this description.

FIG. 10 illustrates a multi-segment sensor according to an embodiment of the disclosure. This graph shows distance along the fiber on the x-axis and nominal placement of each segment within the multi-segment sensor. FIG. 10 depicts eight segments 6a-6h that compose the multi-segment sensors 5a-5e. More or fewer segments may be used. The center wavelength of each segment is distinct and together the segment spectral features cover the wavelength range $\Delta\lambda$ corresponding to the desired dynamic range ($\Delta\varepsilon$ and or $\Delta T$) of the system. While the figure depicts constant spacing of these spectral features, the spacing need not be constant.

The spectral-domain view of the sensor 5a-5e corresponds to that shown in FIG. 7. In this example, there are eight segments exhibiting spectral features the center wavelength of which is spaced 3 nm, each spectral lobe having a FWHM of 0.6 nm. Of course, the FWHM or functional form of the spectral features may vary from that shown. In FIG. 10, the spectral response is depicted in the filled black regions while the center wavelength and spatial width of each segment are depicted by the y-value and width of the horizontal white lines, respectively. Note that the sweep range (horizontal gray bar) for demodulation of the multi-segment FBG is depicted as twice the maximum center wavelength separation between any two neighboring spectral features ($2\widehat{\Delta\lambda}$) plus a small additional amount to cover an appropriate portion of each spectral feature. In FIG. 7, the narrow wavelength range $\overline{\Delta\lambda}$ is 6.6 nm: 6 nm due to twice the maximum spacing between center wavelengths of the spectral features ($2\widehat{\Delta\lambda}$) plus 0.3 nm to extend to the lower side of the FWHM of the lower-wavelength lobe plus 0.3 nm to extend to the upper side of the FWHM of the upper-wavelength lobe (for a total of 0.6 nm, which in this example is equal to $\widetilde{\Delta\lambda}$). We see that, in this embodiment, a narrow wavelength range of only 6.6 nm is possible, a significant reduction relative to the 24 nm wavelength range that would have been required for conventional OFDR.

The embodiment of a multi-segment sensor 5a-5e is different from an independent string of short gratings in that the collection of segments 6a-6h together forms a functional unit, as shall be described in more detail below. Given this functional unit (combination of specific segments), the spectral features may unambiguously be differentiated such that the absolute nominal (initial) wavelength of each spectral feature is known even though a narrow wavelength range has been utilized when interrogating the sensors 5a-5e.

Figure 11:
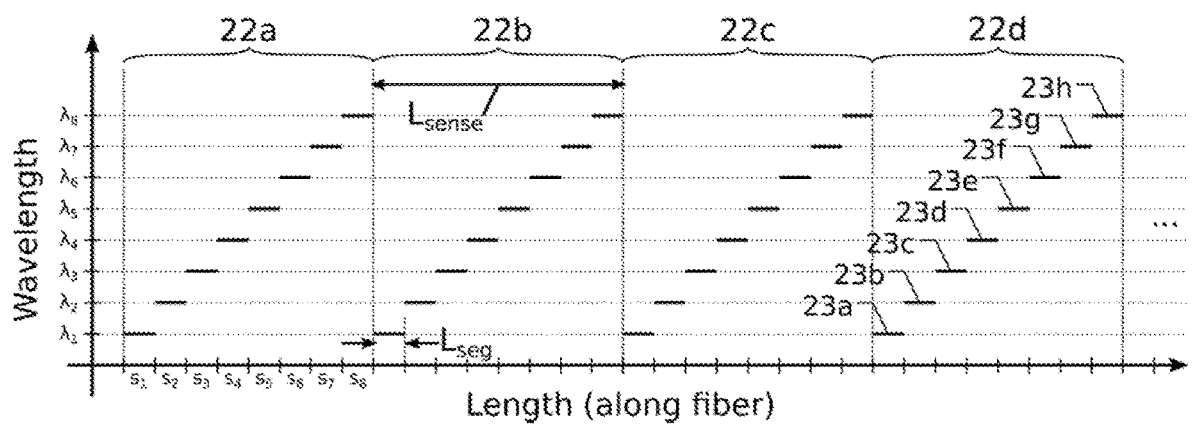
FIG. 11: Non-limiting embodiment of multi-segment FBG suitable for the subject technique. $L_{sense}$ is the multi-segment sensor length, $L_{seg}$ is the segment length, $\lambda_i$ are the center wavelengths of the spectral features in the spectral (wavelength) domain, and $s_i$ are the segment designators in the delay domain.

FIG. 11 illustrates a sensing unit 21 according to an embodiment of the disclosure, the sensing unit including at least four multi-segment sensors 22a-22d, each consisting of eight segments 23a-23h, each segment (denoted $\lambda_i$, i=1, 2, . . . 8) exhibiting one or more distinct spectral features with nominal center wavelength denoted i=1, 2, . . . 8. Note that while FIG. 11 shows contiguous segments within a given multi-segment sensor, the segments may alternatively have non-contiguous spacing (i.e., length $L_{seg}$ less than or greater than segment center-to-center spacing $\Delta L_{seg}$) and/or the segments may be ordered differently. Further, the multi-segment sensors themselves may also be contiguous or have sensor length $L_{sens}$, less than or greater than sensor-to-sensor spacing $\Delta L_{sens}$.

If the light source 7 is swept, the intensity of the interference beat pattern is converted to an analog electrical signal via the optical detector 8 and then to a digital signal via an analog to digital converter 9. At the digital signal processing (DSP) subsystem 10, a Fourier transform of this signal yields a reflectance response as a function of distance down the fiber in what is herein termed the "delay domain." The delay-domain resolution is inversely proportional to the spectral-domain optical frequency range, i.e.:

$$\delta\tau = \frac{1}{\Delta v}$$

where $$v = \frac{c}{\lambda} \text{ and } \Delta v = \frac{c}{\lambda^2}\Delta\lambda$$

In the above equations, $\delta\tau$ is the delay-domain resolution (i.e., the time-of-flight difference between two samples in the delay domain), c is the speed of light in a vacuum, $\lambda$ is wavelength, $v$ is optical frequency, $\Delta v$ is the optical frequency range of the wavelength sweep, and $\Delta\lambda$ is the corresponding wavelength range of the sweep. Note that the narrow wavelength range $\overline{\Delta\lambda}$ may be substituted for the wide wavelength range $\Delta\lambda$ in the equations above according to the embodiments of the disclosure employing the present technique. For example, a 6.6 nm wavelength range at 1550 nm corresponds to a delay-domain resolution of 1.2 ps.

Time of flight down an optical fiber in a double-pass interferometer may be given as:

$$\tau = \frac{2nL}{c}$$

where $\tau$ is the time-of-flight delay, n is the effective refractive index of the fiber, and c is the speed of light in a vacuum. Thus, a 1.2 ps delay-domain resolution corresponds roughly to a 120 μm spatial resolution. Thus, in this example there are roughly eight samples per millimeter in the Fourier transform of an interferogram taken over a 6.6 nm wavelength range.

Since fine resolution is available in the delay—(or spatial) domain of the sensing fiber, it is possible to differentiate each sensor segment via its length and or its position along the sensing fiber.

In the embodiment including the multi-segment sensor 21 shown by FIG. 11, one may perform an initial wide sweep over wavelength range $\Delta\lambda$. The wide sweep may be recorded in the digital signal processing (DSP) subsystem 10 of FIG. 1. Individual subsets of the wide sweep may be taken in the spectral domain and transformed into the delay-domain. The magnitude of the resulting delay-domain trace corresponding to each of the subsets of the wide sweep may be inspected. These wavelength subsets, this trace would show segments of the multi-segment sensor, the spectral features of which were covered by the subset of the wide sweep. Given sufficiently narrow wavelength subsets, individual segments within the multi-segment sensor may be isolated. By inspecting these segments in the delay-domain trace, the location of each segment of each multi-segment sensor may be identified and stored.

Subsequently, when the system is operated over the narrow wavelength range, if the narrow wavelength sweep covers one or more spectral features of a given multi-segment sensor, the magnitude of the delay-domain trace will be non-zero in the region of the segments that were covered by the narrow wavelength range. The specific segments may then be differentiated based on their known positions along the sensing unit 4. If multiple segments are covered by the narrow wavelength range, the left-most segment appearing in the delay-domain trace would have the shortest wavelength (in this example, according to the design shown in FIG. 11), the right-most segment would have the longest wavelength, and any segments in between would be ordered shortest wavelength to longest wavelength.

Given knowledge of the predetermined locations of the individual segments, each may individually be windowed, inverse-Fourier-transformed to the spectral domain, and analyzed to determine the center wavelength of the corresponding spectral feature. Given prior calibration of the center wavelengths of each spectral feature in the nominal configuration (either absolute wavelength or relative wavelength with respect to the narrow wavelength range or some other relative wavelength reference), spectral shift may be calculated for each segment covered by the narrow wavelength range for each multi-segment sensor. Strain or temperature change (relative to the nominal case) may then be calculated based on the spectral shift inferred for each multi-segment sensor.

Figure 12:
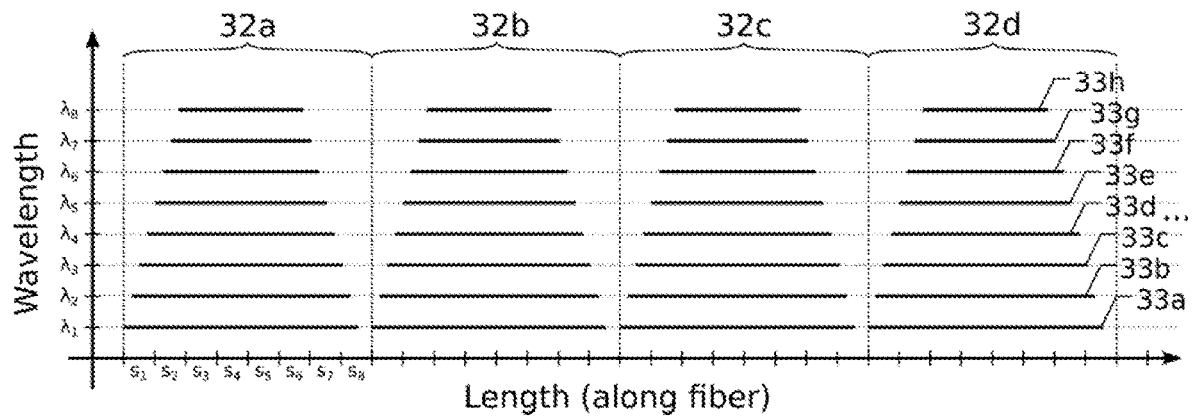
FIG. 12: Non-limiting example embodiment of multi-segment FBG suitable for the subject technique. $\lambda_i$ are the center wavelengths of the spectral features in the spectral (wavelength) domain, and $s_i$ are the segment designators in the delay domain. Note that in this embodiment each segment has a unique width.

1.2 Embodiment 2: Multi-Segment Sensor with Segments with Different Segment Width in Delay Domain FIG. 12 shows a sensing unit 31 according to an embodiment of the disclosure in which each segment 33a-33h of a given multi-segment sensor 32a-32d has a unique width. Absolute feature differentiation may be achieved based on knowledge of the width of each segment. Similar to the process described in [0109], an initial wide wavelength sweep over $\Delta\lambda$ may be performed and separated into several subsets. From the delay-domain representation obtained from each of these subsets, the width of each segment may be measured and stored.

Subsequently, during normal operation of the optical sensor system when the narrow wavelength range $\overline{\Delta\lambda}$ is swept, the resulting sensor segments (based on their appearance in the magnitude of the delay-domain trace) may be differentiated based on their widths in the delay domain, windowed, inverse-Fourier-transformed, and analyzed to determine the center wavelength of the corresponding spectral feature.

Spectral shift and therefore strain or temperature may be inferred for each multi-segment sensor.

Figure 13:
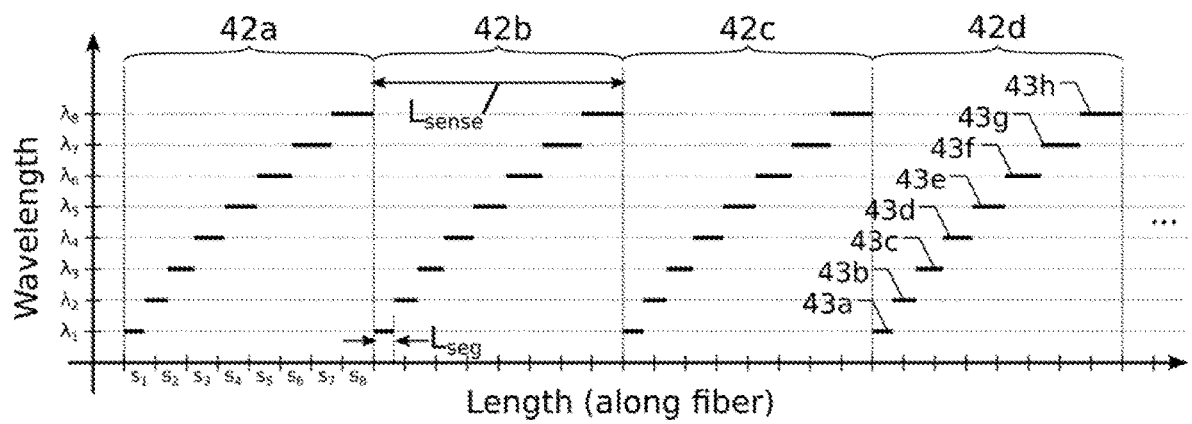
FIG. 13: Non-limiting example embodiment of multi-segment FBG suitable for the subject technique. $\lambda_i$ are the center wavelengths of the spectral features in the spectral (wavelength) domain, and $s_i$ are the segment designators in the delay domain. Note that in this embodiment each sequentially-written segment has a unique width.

FIG. 13 shows an embodiment of a sensing unit 41, in which the individual segments 43a-43h of a multi-segment sensor 42a-42d may be differentiated based on the width of each segment 43a-43h in the delay domain. In this design, the length of the grating segments within a given multi-segment sensor is increased as they are written in the fiber. Note that the variation shown in FIG. 13 is a non-limiting example embodiment of how the segment lengths may be varied in the fiber. The ordering of different lengths and the segment-to-segment spacing of each sequence of gratings may be varied. Offsets between gratings may be varied as well, while keeping the length of each grating the same. In some embodiments, a combination of variation in segment width, and in variation of segment center-to-center spacing may be used to organize a scheme in which individual segment identification (and therefore spectral feature differentiation) may be achieved.

Note that variation of the length of each segment also causes variation in the FWHM of the spectral response arising from each segment. In some embodiments, the system and algorithms may be designed to accommodate the resulting range of FWHM inherent in the spectral response across the wide wavelength range $\Delta\lambda$. Supposing a system dynamic range of $\Delta\varepsilon$, and supposing the length of the shortest grating segment is 1, the difference in length between the gratings in the string should be at least $\Delta\varepsilon \cdot 1$. This is required so the length of each grating, given the maximum tension or compression, is distinct from the possible length of another segment. In this scheme, the width of the narrow wavelength range and the grating length are balanced such that under typical operation the total strain excursion over the course of one multi-segment FBG sensor does not exceed the narrow wavelength range over which the system operates. This ensures a complete spectral feature is contained within the narrow sweep range, and that the length of the grating segment may be inferred from the delay-domain representation of the grating.

Figure 14:
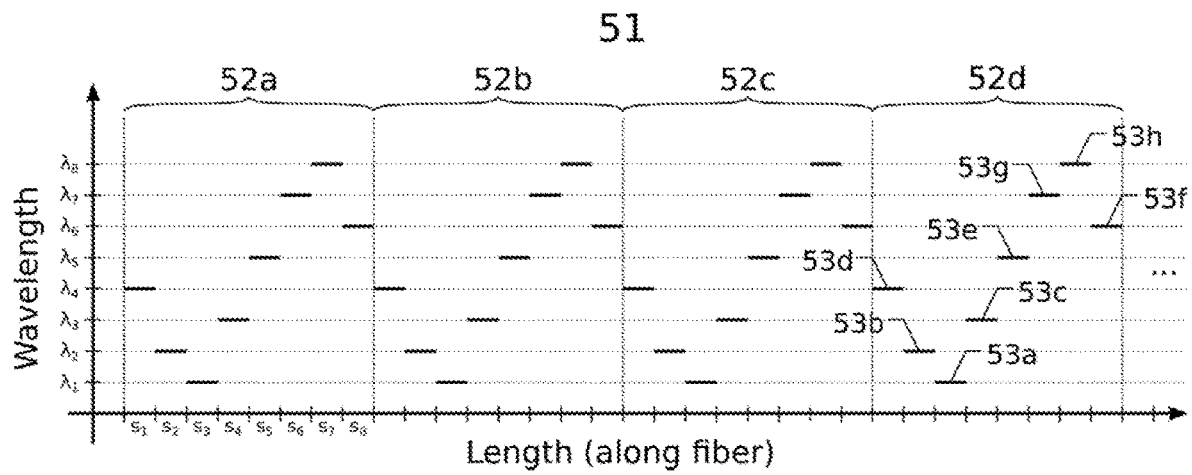
FIG. 14: Non-limiting example embodiment of a multi-segment FBG optimized for absolute feature identification (i.e., identification of nominal center wavelength of each segment, regardless of strain placed upon the sensor).

1.3 Embodiment 3: Multi-Segment Sensor with Modified Spectral Feature Location FIG. 14 shows a sensing unit 51 according to an embodiment of the disclosure in which multi-segment sensors 52a-52d optimized for spectral feature differentiation are implemented. In this example, each multi-segment sensor 52 consists of eight segments 53a-53h, each segment (denoted $\lambda_i$, i=1, 2, . . . 8) exhibiting one or more distinct spectral features with nominal center wavelength denoted $\lambda_i$, i=1, 2, . . . 8. The location of each spectral feature has been modified to facilitate absolute identification of the feature (from which the nominal center wavelength of the feature may be inferred) within the fiber as described below. Note that while FIG. 14 shows contiguous segments within a given multi-segment sensor, the segments may alternatively have non-contiguous spacing (i.e., length $L_{seg}$ less than or greater than segment center-to-center spacing $\Delta L_{seg}$). In addition, the multi-segment sensors themselves may also be contiguous or have sensor length $L_{sens}$ less than or greater than sensor-to-sensor spacing $\Delta L_{sens}$.

FIG. 7 illustrates an example response of a multi-segment sensor consisting of N=8 short FBG segments forming a multi-segment sensor having length $L_{sens}$=10 mm. FIG. 9 shows the evolution of center wavelengths of the spectral features shown in FIG. 7 over time due to time-varying strain imparted on the sensor. In this graph, spectral response is encoded in grayscale where black is zero and white is maximum response. Note the FWHM of the spectral features is such that each spectral feature may easily be distinguished. The white horizontal lines depict a possible choice of narrow wavelength range $\overline{\Delta\lambda}$.

Figure 15:
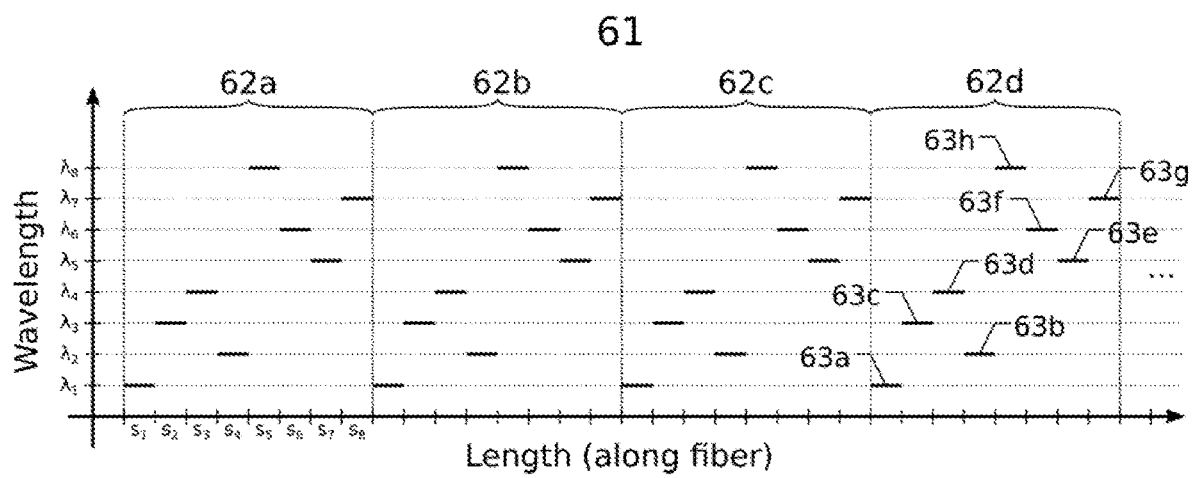
FIG. 15: Another non-limiting example embodiment of a multi-segment FBG optimized for absolute feature identification. Many permutations are possible.

FIG. 15 shows a sensing unit 61 illustrating an alternative embodiment of a multi-segment sensor 62a-62d having segments 63a-63h optimized for absolute spectral feature identification. Those of ordinary skill in the art will recognize that there are many permutations of multi-segment sensors possible that fulfill the purposes of absolute spectral feature identification as discussed below.

1.3.1 Embodiments of Methods of Absolute Spectral Feature Identification

FIG. 16 through FIG. 19 show embodiments of a multi-segment sensor 52 depicted in FIG. 14 undergoing varying levels of tension or compression such that various combinations of spectral features are covered by the narrow wavelength range. When at least two spectral features are covered by the narrow wavelength range, the nominal center wavelength of those features may be absolutely identified via a combination of (a) relative spacing in the delay-domain magnitude trace, and (b) relative center wavelength of the respective spectral features in the spectral-domain.

Figure 16:
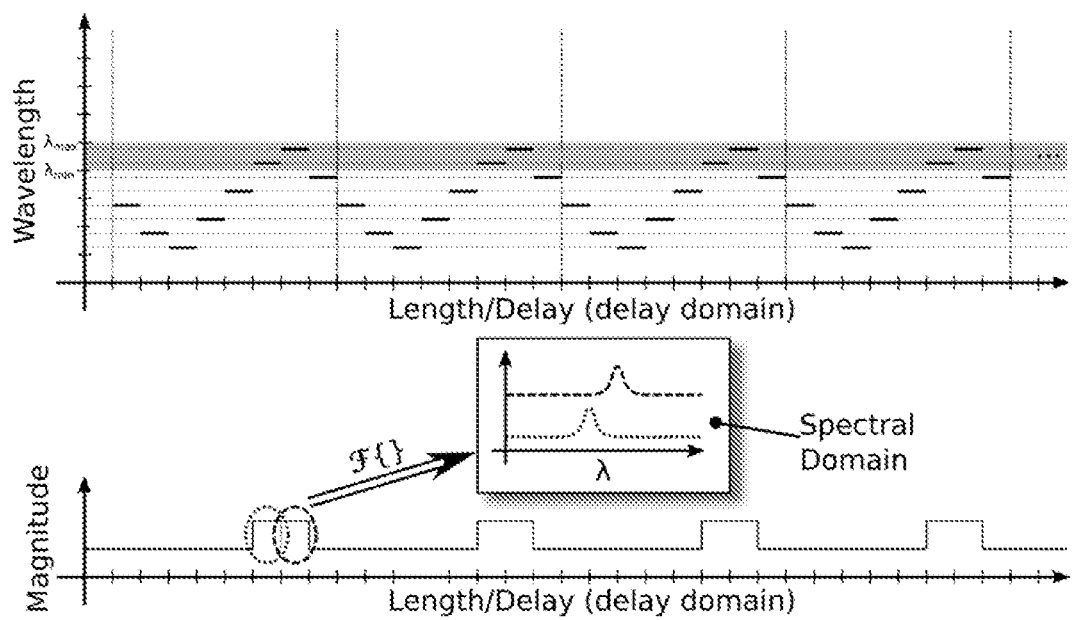
FIG. 16: Top graph: A depiction of a section of multi-segment FBG fiber under compression. In this scenario, the set of nominal center wavelengths is lowered proportional to the compression on the fiber such that spectral features $\lambda_7$ and $\lambda_8$ (as depicted in FIG. 14) are within the narrow wavelength range (which reduced range is depicted by the gray area and bounded by $\lambda_{min}$ and $\lambda_{max}$). Bottom graph: A depiction of the magnitude of the delay-domain trace formed by Fourier-transforming the spectral-domain interference trace taken from an ADC.

Consider the top graph of FIG. 16, for example, where the fiber (i.e., sensing unit 51) is undergoing compression such that the nominal center wavelengths of the features, $\lambda_i$, are shifted down in wavelength with respect to the narrow wavelength range (defined by the gray region bounded by $\lambda_{min}$ and $\lambda_{max}$). The bottom graph of the figure shows a representation of the delay-domain OFDR trace in which the magnitude of the Fourier-transformed spectral data is shown. In this view, the two spectral features (in this example $\lambda_7$ and $\lambda_8$) that are covered by the narrow wavelength range each add to the magnitude trace, resulting in the pattern shown in the bottom graph of the figure. Note the similarities of the magnitude of the delay-domain trace shown in FIG. 16 with that of FIG. 17, the latter of which shows a scenario in which the fiber is in tension such that the narrow wavelength range covers spectral features $\lambda_1$ and $\lambda_2$.

Figure 17:
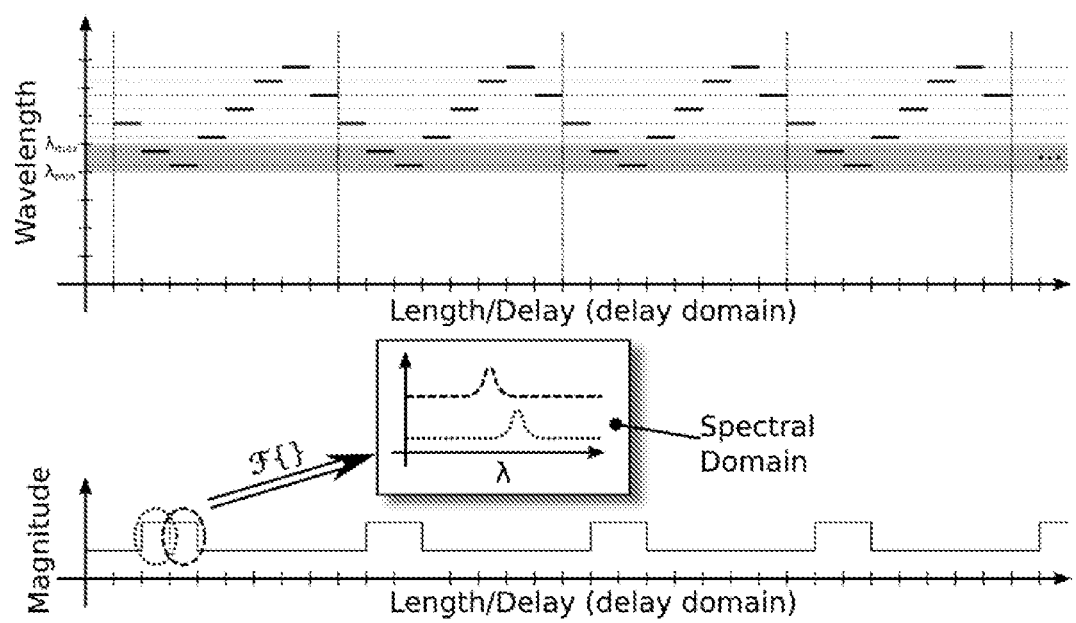
FIG. 17: A depiction of a section of multi-segment FBG fiber under tension. In this scenario, the set of nominal center wavelengths is raised proportional to the tension on the fiber such that spectral features $\lambda_1$ and $\lambda_2$ (as depicted in FIG. 14) are within the narrow wavelength range.

It is seen that the pattern established by the magnitude of the delay-domain trace is not enough to establish whether the covered features are, in this example, the $(\lambda_7, \lambda_8)$ couplet or the $(\lambda_1, \lambda_2)$ couplet. By inspecting Fourier transforms of each delay-domain segment (i.e., those segments shown within the fine and coarse dotted circles in the figures) resulting in the spectral-domain response for each segment, one may absolutely identify not only whether the two features represent the $(\lambda_7, \lambda_8)$ couplet or the $(\lambda_1, \lambda_2)$ couplet, but also which spectral feature is which. For example, in FIG. 16 in the top graph we see that $\lambda_7$ precedes $\lambda_8$ along the length of the fiber. If Fourier transforms of the first and second segments are independently computed, the coarse and fine dotted traces shown in the spectral-domain inset will result. Thus, the order for the scenario presented in FIG. 16 is that the spectral peak in the Fourier transform of the first segment has a center wavelength lower than that of the spectral peak in the Fourier transform of the second segment. Considering again the scenario shown in FIG. 17, we see that this order is reversed with respect to the scenario depicted in FIG. 16. In FIG. 17, we see that the first segment has a higher center wavelength of the Fourier-transformed segment region, while the second segment has a lower center wavelength.

If the scenario is as presented in FIG. 16, then it may be absolutely determined that the first segment (first half of the raised region in the magnitude of the delay-domain trace)

has nominal center wavelength $\lambda_7$ and the second segment has nominal center wavelength $\lambda_8$. If the scenario is as presented in FIG. 17, then it may be absolutely determined that the first segment has nominal center wavelength $\lambda_2$ and the second segment has nominal center wavelength $\lambda_1$. As a side note, the approximate location of the multi-segment sensor may be determined given knowledge of the position of the segments, spectral indices of the segments, and spectral ordering of the segments within the multi-segment sensor.

The subsequent two figures visually outline another of the individual scenarios for the remaining spectral-feature combinations of this example, non-limiting embodiment in which N=8 spectral features corresponding to 8 segments are incorporated in a multi-segment sensor.

As shown in the figures, at least two spectral features must be covered by narrow wavelength range $\overline{\Delta\lambda}$ in order to absolutely identify spectral feature indices. The narrow wavelength range as described above was chosen such that $\overline{\Delta\lambda}$ always incorporates at least two spectral features. This approach might be appropriate, for example, in situations in which the scan-to-scan strain state differences are large. For example, suppose that reduced range $\overline{\Delta\lambda}$ is chosen such that by definition two spectral features are always covered. Assuming a system time resolution $\Delta t$, over $\Delta t$ the strain profile may change by any arbitrary amount and still be properly recovered because the features may absolutely be identified.

It is often the case that two spectral features need not always be included in the reduced sweep $\overline{\Delta\lambda}$. For example, consider a system in which the strain state does not significantly change over a time period $\Delta t$. If a sweep range is chosen to encompass slightly greater than the maximum spectral spacing between spectrally-neighboring segments (i.e., $\overline{\Delta\lambda} \gtrsim \widehat{\Delta\lambda}$), then the strain profile may change over a timeframe $\Delta t$ by up to $\widehat{\Delta\lambda}/2$ before there would be ambiguity in absolute identification of spectral features in the current scan of $\overline{\Delta\lambda}$. An equivalent statement for a choice of $\overline{\Delta\lambda} \approx \widehat{\Delta\lambda}$ is that all transient behavior scan-to-scan is smaller than half the spectral spacing between segments.

1.3.2 Process of Engineering Value (e.g., Strain/Temperature) Inference with Multi-Segment Sensors Following is a description of the process by which absolute or relative engineering values (e.g., absolute or relative strain or temperature) may be inferred by a narrow sweep range in conjunction with the present embodiment.

Figure 20:
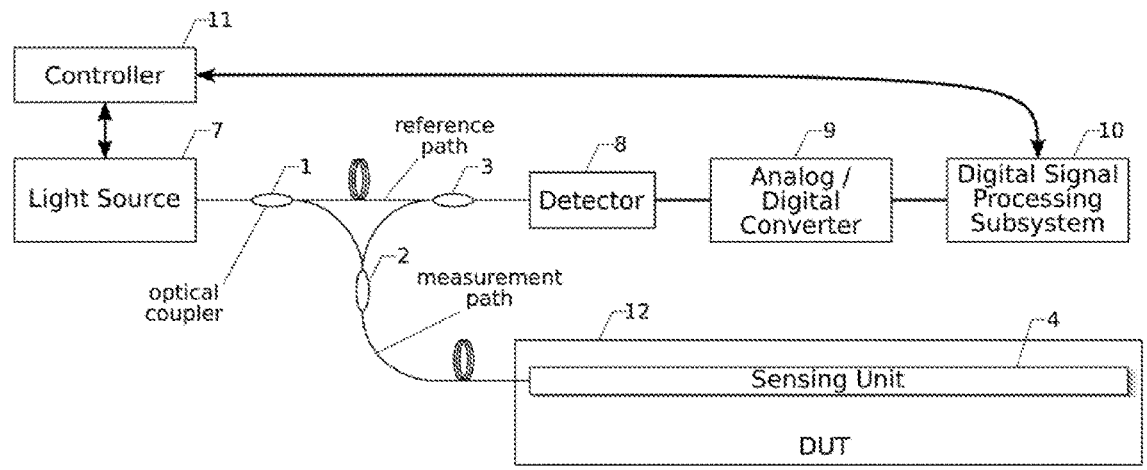
FIG. 20: System according to the various exemplary embodiments. This diagram shows a sensing unit being applied to a device under test or DUT. A common application of sensing unit to DUT is bonding of, e.g., a sensing fiber to the DUT via an adhesive.

In a typical strain sensing application, a length of sensor fiber is bonded to, e.g., a component 12 (i.e., the device under test, which we will call the DUT or device under test) as depicted in FIG. 20. Note that the DUT might be a single component, a structure, or a collection of components or structures. The objective of the testing or monitoring is often to recover the strain and or temperature (or other effect that may be transduced to strain and or temperature) as a function of position along the path defined by the sensing fiber position on the DUT.

Note that the quality and consistency of the adhesive material, application, and cure process directly affect residual strain imparted by the DUT on the fiber in the nominal strain state of the DUT. The result is that there may be slight or significant residual strain in the optical fiber as a function of position along the DUT. It is understood that this residual strain represents a nominal (or initial) condition, and that the user often intends to measure the strain as a relative departure from this nominal condition. Note, also, that the user may also desire to measure the total difference in strain profile at any point in time with respect to that in the fiber when the sensors were written into the fiber (i.e., unbonded, unstrained fiber).

Figure 27:
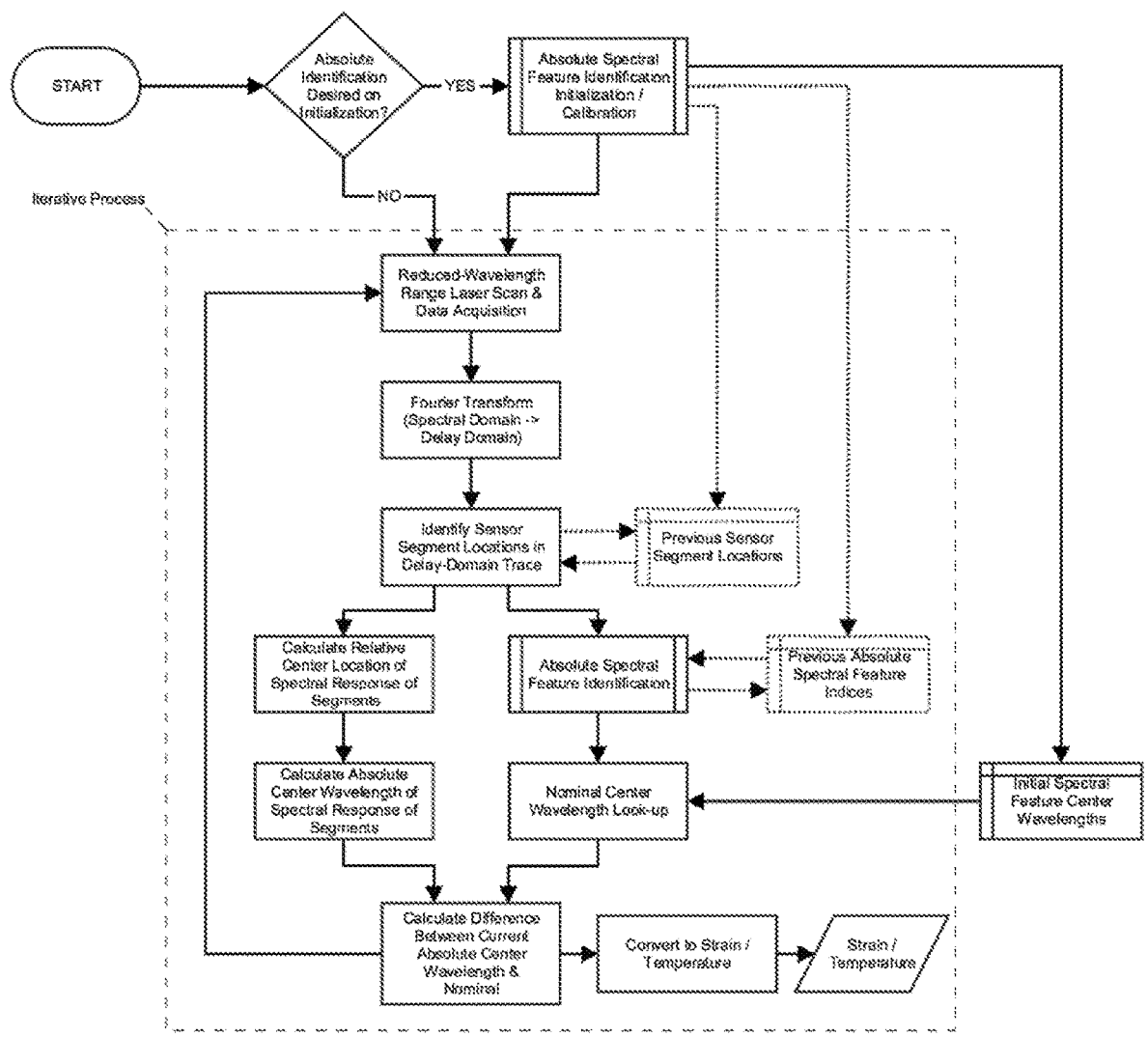
FIG. 27: Process diagram showing a process that implements the presented embodiments of sensor design(s) in a functional system using a narrow wavelength range, according to various embodiments of the disclosure.

FIG. 27 shows the main process diagram which will be described herein. The process begins with an optional absolute spectral feature identification process. This may take the form of a full wavelength scan (i.e., sweep) intended to characterize and or verify the nominal center wavelengths of all spectral features of all sensors in the fiber, or it may take the form of a narrower wavelength scan intended to cover twice the maximum wavelength spacing between spectral features (of segments in a multi-segment sensor) in order to determine the indices of the spectral feature(s) that will be seen in the narrow wavelength range immediately subsequent to this initial identification process. In the former case, a wavelength range sufficiently wide to identify nominal center wavelengths of each feature for each sensor is utilized, with the resulting data stored in a look-up table. In the latter case, the nominal center wavelengths (i.e., those at zero-state) are understood to have already been characterized (either on the subject system or a separate calibration system) and entered into a look-up table.

1.3.2.1 Wide-Wavelength Sweep Calibration/Initialization

Two embodiments of techniques for wide-wavelength sweep calibration/initialization are described in the following two sections. For either technique, given a laser that is capable of sweeping over $\Delta\lambda$, the system may establish an absolute reference from which relative measurements may thereafter be made in a time interval $\overline{\Delta\lambda}/\Delta\lambda$ times that of the standard interval over which the system may complete a scan over $\Delta\lambda$.

1.3.2.1.1 Using One Wide Sweep/Acquisition

A wide wavelength sweep of the light source (i.e., over $\Delta\lambda$ from a predetermined start wavelength to a predetermined destination wavelength) may be carried out to determine the full extent of the several spectral features of each grating in the fiber. The scan may be carried out at the same sweep speed as employed in the subject technique in order to recover a single acquisition that contains all pertinent data while not exceeding the acquisition bandwidth of the narrow-wavelength-range optimized system. These data may then be processed in a non-real-time fashion to recover the center wavelengths of each spectral feature for each sensor in what would be defined a nominal (or zero-) state.

This wide wavelength sweep and calibration may be completed at any time in which there is sufficient time to complete it, and may be carried out while the system is in operation if the system update rate may temporarily be reduced. For example, the wide wavelength sweep may be carried out at the same sweep speed as the narrow wavelength sweep required for the narrow-wavelength-range technique, with a resulting system scan time that is $\Delta\lambda/\overline{\Delta\lambda}$ times longer than the narrow wavelength scan.

Upon sweeping over the wide wavelength range $\Delta\lambda$, the spectral features may be numbered and absolutely identified by inspection since either all spectral features will be present in the wide scan, or at least one side (i.e., lower- or upper-wavelength side) of the set of spectral features will be apparent due to absence of spectral features on either the low- or high-wavelength side of the scan. The spectral features that would fall within $\overline{\Delta\lambda}$ are optionally specifically identified and narrow sweeping over the range $\overline{\Delta\lambda}$ may begin.

1.3.2.1.2 Using Several Sub-Range Acquisitions

Alternatively, the wide-wavelength initialization/calibration of each spectral feature of each sensor may be performed according to the subject technique. In this case, the total wide wavelength range is split into M sub-acquisitions, each covering at least $\overline{\Delta\lambda}$, such that M≤⌈Δλ/$\overline{\Delta\lambda}$⌉, where ⌈ ⌉ is understood to be the ceiling function.

Figure 26:
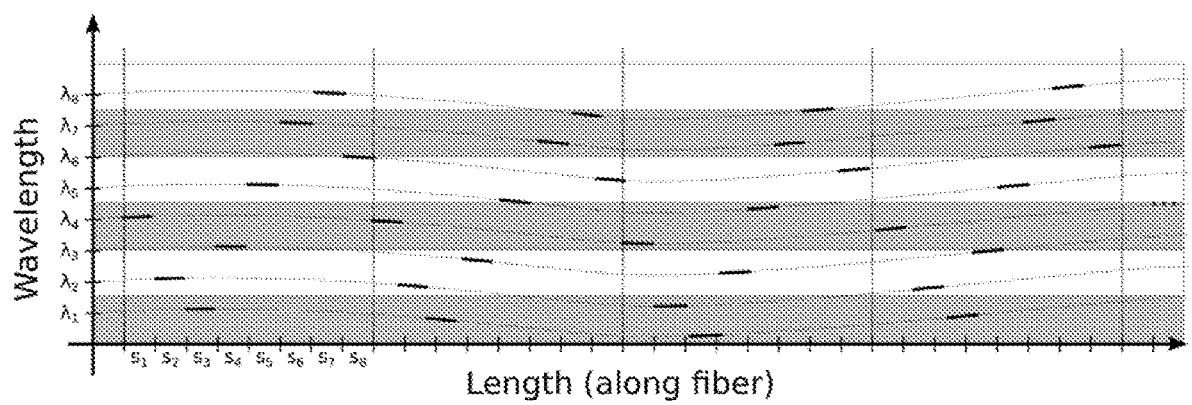
FIG. 26: Use of individual wavelength sub-ranges (depicted by horizontal white and gray bars) to perform an initial (or real-time) absolute identification of spectral features for each multi-segment sensor. The wavelengths of the spectral features vary due to an initial residual strain profile imparted on the fiber due, for example, to the fiber application process or to the initial (nominal) state of the DUT. For a given multi-segment sensor design profile, a narrow wavelength range may be defined such that at least one of the sub-ranges will contain two spectral features necessary for absolute identification. Preceding or subsequent sub-ranges may then infer spectral feature indices based on the wavelength sub-range(s) in which absolute identification is possible.

For each sub-acquisition, the technique outlined in sections [0187] through [0229] is carried out. Absolute sensor indices are determined for those segment groups for which it is possible to infer them, and relative sensor spectral feature center wavelengths are inferred for all features. For sensors for which absolute sensor indices were not able to be determined (e.g., because there was only one spectral feature of the multi-spectral-feature sensor covered by the given wavelength sub-range), at least one wavelength sub-range of the set will contain sufficient information to infer the absolute spectral feature indices. Thus, the spectral feature index for the previous wavelength sub-range is known to be 1 less than the minimum spectral index in the current wavelength sub-range. FIG. 26 shows this process being carried out on a single multi-segment sensor of the sensing unit. In the figure, the total wavelength range Δλ is shown by the extent of the set of solid horizontal bars. The first wavelength sub-range is shown by the gray horizontal bar, the second wavelength sub-range is shown by the white horizontal bar, etc. Considering the second multi-spectral-feature sensor depicted in the graph, in the first wavelength sub-range, only one segment of the sensor is covered; thus, in the absence of additional a priori information (e.g., the location of the segment in relation to the sensor boundaries), the index of the spectral feature cannot be determined (allowing for the possibility that there are additional spectral features outside the range Δλ). If we define the sub-wavelength range appropriately such that at least one sub-range over the complete range Δλ must necessarily cover two segments for all sensors in the sensing unit, the absolute spectral feature indices may accurately be recovered. Again considering the second sensor in the graph, and considering that the recovered spectral feature indices for the two segments in the second sub-range are 1 and 2, since the previous sub-range (gray) is contiguous in wavelength to the current sub-range (white) it may be determined that the spectral feature index in the previous sub-range is 0. Similarly, it may be determined that the spectral feature index in the third sub-range (gray) is 3. In this manner, all spectral feature indices may be inferred for each sensor over the complete wavelength range Δλ necessary to cover the specified dynamic range (Δε and or ΔT).

The Msub-ranges are scanned/acquired (sequentially in one laser sweep if desired); absolute spectral feature indices and relative center wavelengths of each spectral feature (i.e., for each segment of each multi-segment sensor) in each sub-range are inferred. Using these data along with knowledge of the absolute min/max extents of each wavelength sub-range, the complete set of absolute nominal wavelengths may be calculated and entered into a look-up table according to spectral feature index for later use.

1.3.2.2 Narrow Wavelength Range Sweep

The beginning of the iterative process is a laser sweep carried out over the narrow wavelength range $\overline{\Delta\lambda}$. The system contains an absolute or relative wavelength reference such that the wavelength extents (and evolution) of the laser sweep over $\overline{\Delta\lambda}$ are known to within the desired wavelength accuracy of the system (which in turn is proportional to the desired strain accuracy and or temperature accuracy). The wavelength extents of sub-range $\overline{\Delta\lambda}$ need not be static as long as the wavelength extents (and evolution) are known for each sweep.

The laser sweep speed and acquisition sample rate are determined based on parameters such as system sample rate, desired fiber interrogation length, etc.

1.3.2.3 Detection, Conversion, and Delay-Domain Transformation

As described above, as the laser sweeps, measurement light reflects from a continuum of points along the sensing unit; each reflecting light field interfering with light in the reference path of the interferometer. The time-of-flight difference between reference and measurement paths results in a modulation in the beat pattern of the interference that encodes the complex reflectivity of the sensing fiber as a function of optical time-of-flight delay (or distance) along the sensing unit.

A detector converts the intensity of this beat pattern into an analog electrical signal, which is in turn converted to a digital signal via an analog-digital converter.

A Fourier transform may be used to transform the spectral—(i.e., wavelength-) domain data into a representation in which complex reflectance is given as a function of delay along the fiber.

1.3.2.4 Identification of Sensor Segment Locations in Delay-Domain Trace

In this step of the process, sensor segment extents (i.e., boundaries of the spatial range of the grating segments) in the delay-domain magnitude trace are identified according to one or more embodiments of the disclosure. In one embodiment, the magnitude of the delay-domain data may be analyzed and a simple thresholding operation used to identify segment spatial extents (i.e., position within the sensing unit occupied by the respective grating segment). Consider the delay-domain magnitude trace shown in FIG. 16. Here, gratings are roughly represented by a rect function in delay (i.e., a raised magnitude in the vicinity of a grating). If apodized FBGs are used for the sensor segments, the magnitude of the delay-domain trace would exhibit functional form similar to the respective apodization window function. In any case, the centers of each segment (that exhibits a response within the wavelength sub-range) may be found and saved. If (in the case of a rect function) there is a raised magnitude region in the trace corresponding to $\Delta L_{seg}+L_{seg}$, then this region is understood to be two contiguous segments exhibiting spectral response in $\overline{\Delta\lambda}$. The center position of this two-segment region is modified to give two center positions of the respective segments.

As shown in FIG. 14 and FIG. 15, the maximum spacing between nearest-spatial-neighbor segment centers within a multi-segment sensor is $(N/2)\cdot\Delta L_{seg}$. For example, for N=8, the maximum center-to-center spacing is $4\Delta L_{seg}$. Thus, in this case any two segments along the magnitude trace of the fiber with centers closer than or equal to $4\Delta L_{seg}$ are defined to be in a segment couplet. Due to the design of the multi-segment sensor, these segment couplets by definition belong to the same multi-segment sensor (except for the case of $L_{sens}\equiv\Delta L_{sens}$ and the L4H/H4L combination of Table 1, which may be distinguished in the subsequent process described in the following section).

If the narrow wavelength range covers three (or more) spectral features, two (or more) couplets may be identified for that multi-segment sensor; the couplets may be independently analyzed according to the present method.

Note that these segment center locations may optionally be stored for use in a subsequent iteration.

1.3.2.5 Absolute Spectral Feature Identification

For each segment couplet, the distance between centers is divided by the segment spacing $\Delta L_{seg}$ and rounded, giving an integer. Consider FIG. 14 and FIG. 15; in these figures consider that a sub-wavelength range is chosen such that $\overline{\Delta\lambda} \geq \widehat{\Delta\lambda} + \overline{\widehat{\lambda}}$. That is, suppose the sub-wavelength range is wide enough to include, at a minimum, the maximum spacing between any two neighboring spectral features plus half the FWHM of each spectral feature. (Note that this is not a necessary condition; depending on other system requirements and time-invariance of the DUT, a narrower wavelength range may be chosen). For the sub-wavelength ranges shown in FIG. 16 through FIG. 19; each of these sub-wavelength ranges include two segments (i.e., two spectral features) of each sensor. One of the spectral features has a lower wavelength relative to the other. Denote the lower wavelength spectral feature "L," the higher wavelength feature "H," and denote the spacing between the two features in the delay domain as an integer multiple of the segment spacing $\Delta L_{seg}$. For example, if the first spectral feature encountered in the delay domain has the lower wavelength of the two, and the spacing between segment centers is $2\Delta L_{seg}$, then denote this pattern L2H. Table 1 summarizes patterns for the sensor designs shown in FIG. 14 and FIG. 15. Note that each pattern instance is unique (i.e., there are no repetitions of a given pattern in any row of a single column of the table). Note also that the designs shown have the unique feature that each only has one pattern that bridges the sensor boundary; if the sensor spacing $\Delta L_{sens}$ is increased such that it is greater than $L_{sens}$, then only the H4L pattern is compromised (yet this pattern is unnecessary for proper identification of spectral features since it bridges a multi-spectral-feature-sensor boundary).

TABLE 1

Relative Patterns of Two Spectral Features Covered by Narrow Wavelength Range $\Delta\lambda$ for FIG. 14 and FIG. 15.

| Sub-Range Contains | FIG. 14 Pattern | FIG. 15 Pattern |
|---|---|---|
| $\lambda_1$ and $\lambda_2$ | H1L | L3H |
| $\lambda_2$ and $\lambda_3$ | L2H | H2L |
| $\lambda_3$ and $\lambda_4$ | H3L | L1H |
| $\lambda_4$ and $\lambda_5$ | L4H/H4L* | L4H/H4L* |
| $\lambda_5$ and $\lambda_6$ | L3H | H1L |
| $\lambda_6$ and $\lambda_7$ | H2L | L2H |
| $\lambda_7$ and $\lambda_8$ | L1H | H3L |

*Bridges sensor boundary

Figure 18:
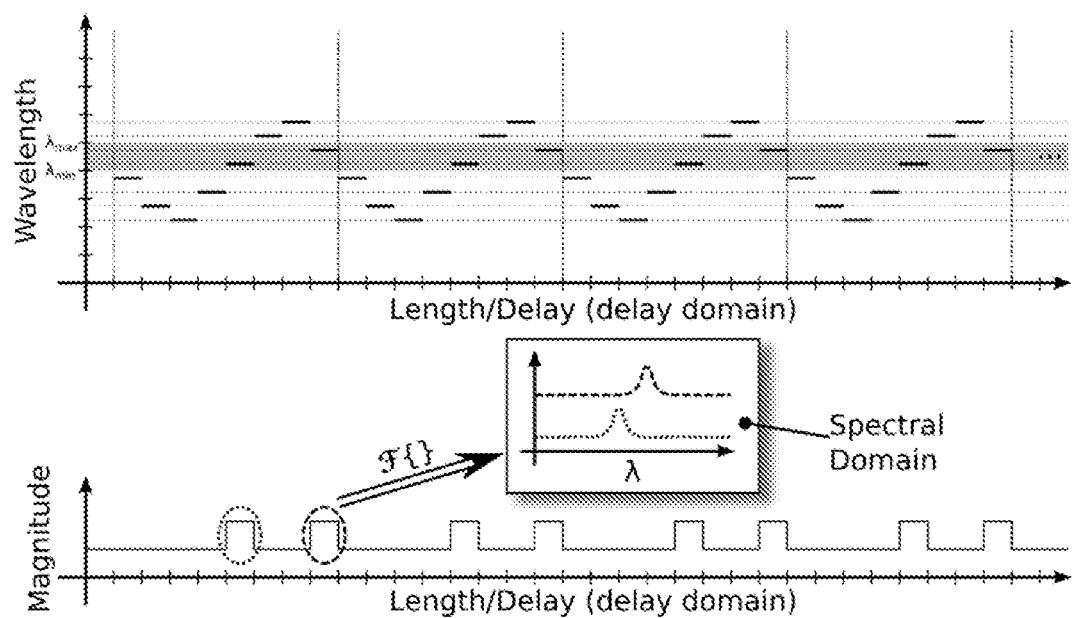
FIG. 18: A depiction of a section of multi-segment FBG fiber. In this scenario, due to strain acting on the fiber, the set of nominal center wavelengths is modified proportional to the strain on the fiber such that spectral features $\lambda_5$ and $\lambda_6$ (as depicted in FIG. 14) are within the narrow wavelength range.
Figure 19:
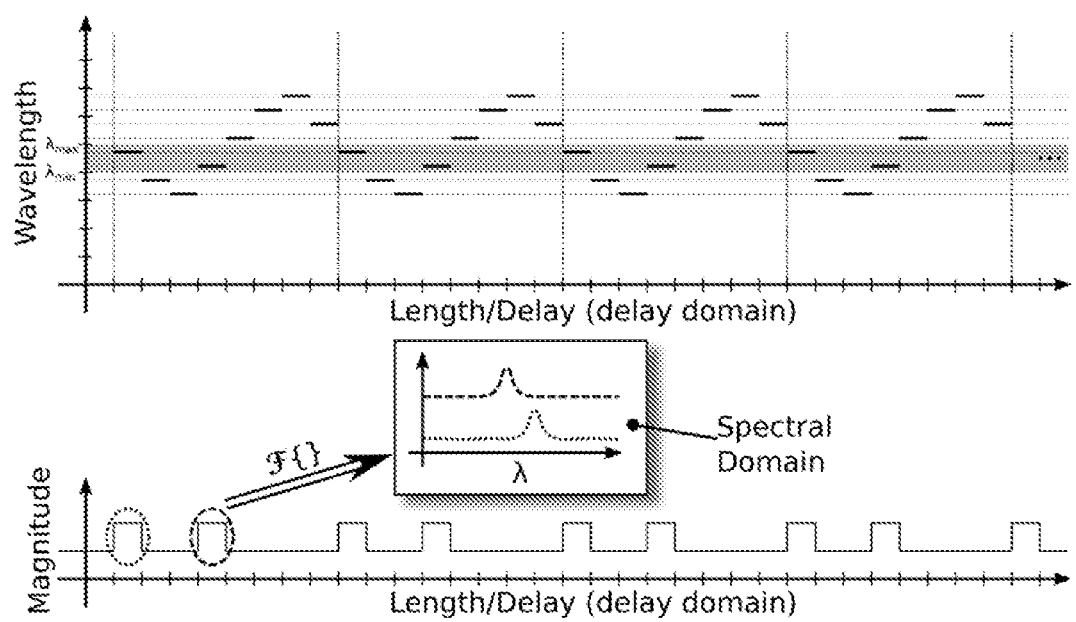
FIG. 19: A depiction of a section of multi-segment FBG fiber. In this scenario, due to strain acting on the fiber, the set of nominal center wavelengths is modified proportional to the strain on the fiber such that spectral features $\lambda_3$ and $\lambda_4$ (as depicted in FIG. 14) are within the narrow wavelength range.

Once segment centers have been identified and grouped according to section [0187], and the center differences have been divided by $\Delta L_{seg}$ and rounded to form integer indices, segments within each couplet may be characterized as "L" or "H" as shown in FIG. 17 through FIG. 19. There are various methods to classify each segment's spectral feature as being higher or lower than its complement within the couplet. The figure shows only one example method for doing this; other methods may also be possible. In one example method, the segment is windowed and Fourier transformed back to the spectral domain. In this domain, an algorithm (e.g., a centroid algorithm, convolution with a matched filter, etc.) is used to infer the center wavelength of the spectral feature. The two center wavelengths are then compared and the segment corresponding to shorter wavelength denoted "L" while the segment corresponding to longer wavelength denoted "H." This is one embodiment of a method that may be used to determine relative center wavelengths of the spectral features. The pattern is then directly interpreted from left to right along the delay domain and classified as shown in Table 1. Table 2 shows the absolute indices that are inferred based on the detected pattern of a given segment couplet. For N=8 and the sensor designs shown in the respective figures, this is the set of valid patterns a segment couplet may exhibit.

TABLE 2

Spectral feature absolute indices corresponding to sensor group patterns. In this example N = 8; the indices range from 1 to N.

| FIG. 14 Segment Couplet Pattern | FIG. 15 Segment Couplet Pattern | Low-Wavelength Spectral Feature Absolute Index | High-Wavelength Spectral Feature Absolute Index |
|---|---|---|---|
| H1L | L3H | 1 | 2 |
| L2H | H2L | 2 | 3 |
| H3L | L1H | 3 | 4 |
| L4H or H4L | L4H or H4L | 4 | 5 |
| L3H | H1L | 5 | 6 |
| H2L | L2H | 6 | 7 |
| L1H | H3L | 7 | 8 |

These indices may optionally be stored for use during a subsequent sweep.

Note that in the case that the narrow wavelength range covers three (or more) spectral features, additional designators may be used. For example, for the case of three spectral features, "L," "M," and "H" may be used meaning low, middle, and high, respectively. The multiple segment couplets may then be properly designated. For example, L2M would match the L2H pattern herein described; M2H would also match the L2H pattern (since for a given couplet we are primarily concerned with the relative wavelengths within the couplet).

1.3.2.6 Nominal Center Wavelength Lookup

Once the spectral feature indices of each feature within $\overline{\Delta\lambda}$ have been found for each multi-spectral feature sensor, a table look-up of the nominal center wavelength is performed for each segment for each sensor (these nominal center wavelengths may be absolute numbers, or may be relative to some other defined reference in the system, e.g., a molecular gas absorption spectral feature). The data in the table may have been determined ahead of time, e.g., as described in section [0174]. Each multi-spectral-feature sensor is properly matched from the initial calibration/initialization step (if performed) such that the nominal wavelength accessed from the look-up table correctly applies to the sensor in question.

Matching a multi-spectral feature sensor scanned at a given time to the sensor scanned during initialization/calibration may be facilitated by doing the following. First, on calibration/initialization, initial locations of each segment are stored and each segment is appropriately designated according to the multi-segment sensor (i.e., functional unit) to which it belongs. Second, on each iteration the stored segment locations may be updated (optionally, other segment locations (i.e., outside the range $\overline{\Delta\lambda}$) in the same multi-segment sensor may be inferred from this data and knowledge of the multi-segment sensor design), and the designation is updated of mapping of segment to the multi-segment sensor to which it belongs.

These data storage and update steps are shown as dotted lines and data storage boxes in the flow graph of FIG. 27.

1.3.2.7 Calculation of Relative Center Wavelength(s) of Spectral Response of Segment(s)

The wavelength extents (and sweep evolution) of $\overline{\Delta\lambda}$ may be well characterized such that the wavelength of the laser sweep is known for the spectral-domain data that were acquired in the time-domain. The evolution of wavelength as a function of time may be used to map the samples linear in the time domain to samples approximately linear in the spectral domain.

Once the time-domain data are mapped to the spectral— (i.e., wavelength- or optical frequency-) domain, the remaining task is to find the center wavelength of the spectral response of each segment relative to the narrow wavelength range $\overline{\Delta\lambda}$. Inspecting FIG. 15 for example, we see that each segment occupies a unique space within the delay-domain trace of the multi-segment sensor. Thus, once the segment is windowed in the delay-domain, if it is transformed back to the spectral domain (or simply considered in the delay-domain), the resulting spectral response has been isolated to that specific segment. The center wavelength of the spectral feature resulting from a given segment may be determined without influence or interference of the spectral response of neighboring segments due to the unique segment placement within the physical region of a multi-segment sensor.

An embodiment of a method by which the center wavelength may be extracted from the isolated spectral response of each segment is as follows. The segment may be windowed, inverse Fourier-transformed, and the center of the spectral feature may be determined (by, e.g., a centroid algorithm, convolution with a matched kernel, fitting to a static functional form representing the wavelength response of the spectral feature, etc.)

The resulting center wavelengths are thus inferred relative to the start wavelength (or center, or end wavelength, as the case may be) of the reduced laser sweep range.

If a given spectral response is too close to the edge of the narrow wavelength range $\overline{\Delta\lambda}$ to be properly analyzed, if $\overline{\Delta\lambda}$ is properly defined then its neighboring segment will have a response that is located sufficiently inside the extents of the narrow wavelength range such that the center wavelength of the neighboring segment may accurately be determined. In this step, segments with spectral response too close to the edge of the wavelength range may be disregarded (e.g., marked invalid).

1.3.2.8 Calculation of Absolute or Relative Center Wavelength(s) of Spectral Response of Segment(s)

In this step, an appropriate wavelength offset is added to the relative wavelengths obtained as outlined in the previous step (section [0223]), resulting in absolute center wavelengths for each spectral feature, or in center wavelength numbers relative to a given system reference (for example, a spectral feature or features formed by wavelength-selective absorption of light passed through a particular atomic or molecular gas, which spectral features may exhibit a high degree of stability for a range of environmental conditions).

1.3.2.9 Calculation of Strain and/or Temperature

In this step, the difference between the nominal wavelength (e.g., from an initialization or calibration step) and current absolute wavelength is computed for each valid segment. If a wavelength reference is used in which both the nominal and current wavelengths are known relative to the wavelength reference, this will also suffice. Since wavelength shift is proportional to strain in the fiber, this wavelength shift may be mapped to strain and/or temperature via a pre-characterized or calibrated function (for example, a simple multiplicative constant and offset).

The result is strain or temperature values for each valid segment (covered by the narrow wavelength range $\overline{\Delta\lambda}$), and location information of each valid segment. Optionally, the strain and/or temperature profile as a function of delay or distance may be resampled such that the resulting set of output samples is linear in delay or distance as desired.

1.4 Example Embodiment 4: Multi-Segment Sensor with Segment-Width to Segment-Spacing Ratio >1

In various embodiments of the disclosure each segment of a multi-segment sensor may be wider than the segment-to-segment spacing. One may thus design multi-segment sensors in which the sensor length $L_{sens}$ does not impose a direct limitation on the FWHM of the spectral features exhibited by its segments.

Figure 21:
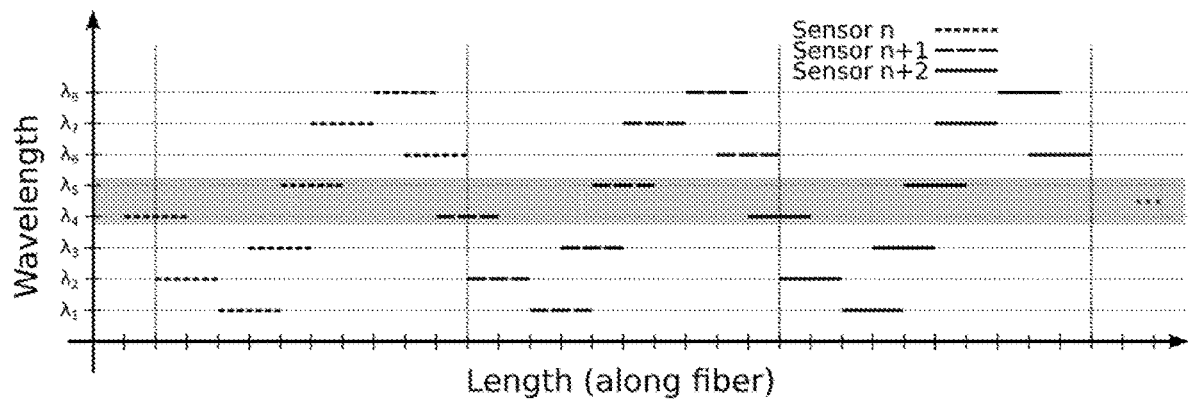
FIG. 21: Alternate embodiment of multi-segment FBG in which segment length is 2× the average segment spacing (in the limit as $N\to\infty$). An example narrow wavelength range that covers no more than two features at a time is shown by the gray horizontal bar. Note as the multi-feature spectral response moves up and down in wavelength with respect to the narrow wavelength range, that there is no overlap of any segments in the delay-domain. In addition, the same principles of (a) delay-domain pattern plus (b) relative location of spectral peaks, allow absolute identification of each spectral feature with knowledge only of the reduced-wavelength response. Each consecutive multi-segment sensor is shown in a different line style. Vertical dotted lines show multi-segment sensor center-to-center spacing $\Delta L_{sens}$.

Consider, for example, the arrangement shown in FIG. 21. In this case, a spectral segment ordering similar to that shown in FIG. 14 is employed, but here the segment length $L_{seg}$ is approximately twice the average center-to-center spacing of each segment (i.e., $L_{seg} \approx 2 \cdot \Delta L_{seg}$).

Figure 22:
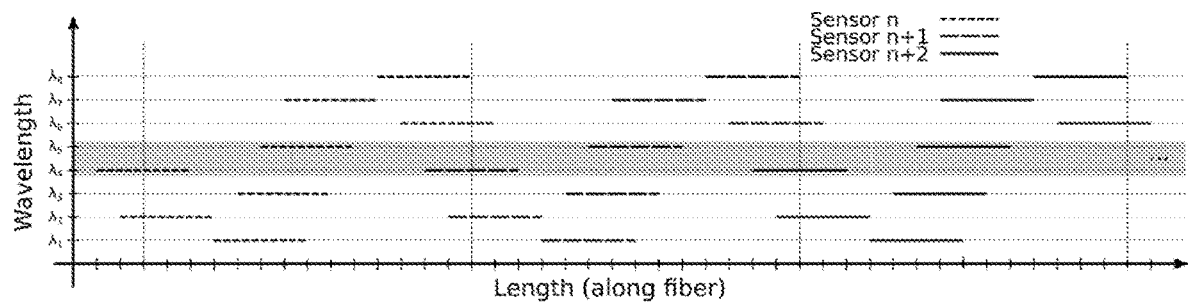
FIG. 22: Alternate embodiment of multi-segment FBG in which segment length is 4× the average segment spacing (in the limit as $N\to\infty$), appropriate for absolute identification of spectral features given only the narrow wavelength range. Each consecutive multi-segment sensor is shown in a different line style. Vertical dotted lines show multi-segment sensor center-to-center spacing $\Delta L_{sens}$.

FIG. 21 not only shows an example of a scheme in which the average center-to-center segment spacing $\Delta L_{seg}$ is smaller than the segment length $L_{seg}$, but also in which the center-to-center spacing $\Delta L_{sens}$ of the multi-segment sensor is smaller than the multi-segment sensor length $L_{sens}$. The horizontal gray bar in the figure represents an example narrow wavelength range $\overline{\Delta\lambda}$ that in this case covers at most two segments. FIG. 22 shows another non-limiting example embodiment of multi-segment sensors in which $\Delta L_{sens} < L_{sens}$ and $\Delta L_{seg} < L_{seg}$; in this case, $L_{seg} \approx 4 \cdot \Delta L_{seg}$.

Allowing $L_{seg}$ to be greater than $\Delta L_{seg}$ has distinct advantages. For a given multi-segment sensor length $L_{sens}$, allowing $L_{seg} > \Delta L_{seg}$ means that the FWHM of each spectral feature may be reduced, or that for a given FWHM the number of segments N may be increased. Reduced FWHM may lead to improved accuracy and precision of the resulting engineering values (e.g., strain, temperature, etc.). Alternatively, increased number of segments N may lead to further reduction in the narrow wavelength range $\overline{\Delta\lambda}$ and or increased overall dynamic range addressable by the system. Further reduction in width of the narrow wavelength range $\overline{\Delta\lambda}$ in turn leads to decreased maximum OFDR demodulation frequency and or decreased system cost and or improved system sample rate.

Figure 23:
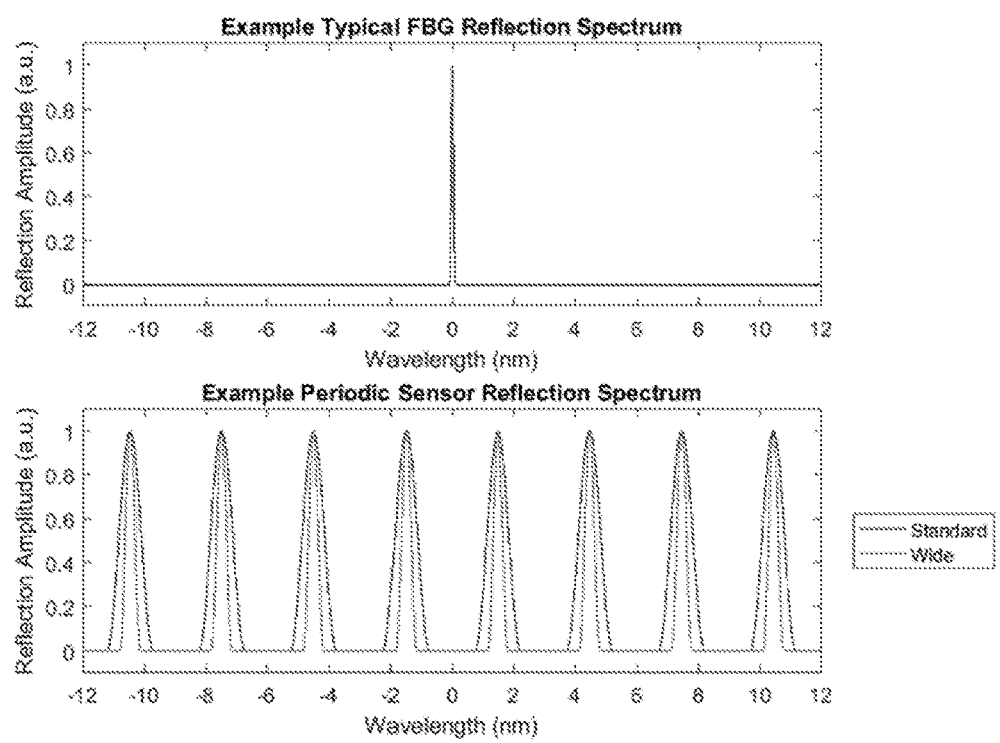
FIG. 23: Top graph: Response of a single 10 mm FBG (for reference). Bottom graph: Comparison of response exhibited by segments of the multi-segment sensor depicted in FIG. 14 (black) compared to the FWHM exhibited by segments of FIG. 22 (gray). Both multi-segment sensors have the same physical length (in this case $L_{sens}$=10 mm) in fiber and N=8 segments. In this case, the FWHM of the response of the improved sensor (gray) is less than half that of the original sensor (black).

FIG. 23 shows an example of the improvement that may be obtained by a sensor where $L_{seg} > \Delta L_{seg}$. The top graph shows the FWHM of a 10 mm FBG for reference purposes. The black trace in the bottom graph shows the FWHM of a multi-segment sensor with $L_{seg} = \Delta L_{seg}$, $L_{sens} = 10$ mm, and N=8. The gray trace shows the FWHM of the multi-segment sensor depicted in FIG. 22 with the constraint $L_{sens} = 10$ mm. In this example, a greater than 2× reduction in FWHM has been achieved.

Figure 24:
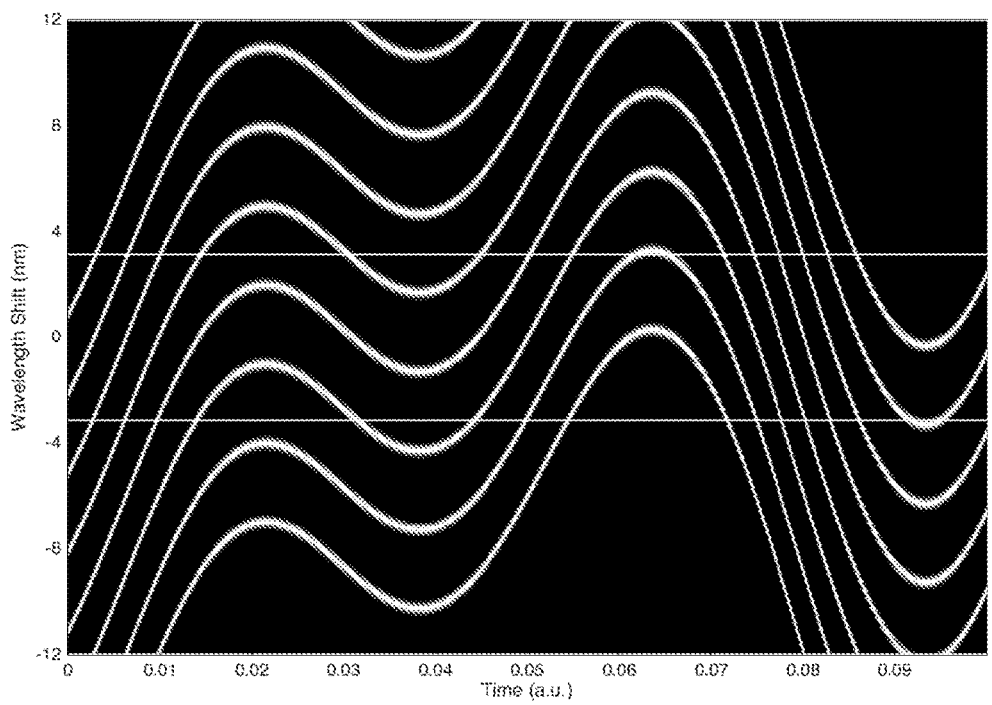
FIG. 24: Alternative representation of response exhibited by multi-segment sensor shown in FIG. 22 with $L_{sens}$=10 mm. Note improvement in FWHM compared to the response shown in FIG. 8. Spectral response is encoded in grayscale where black is zero and white is maximum response.

FIG. 24 shows a grayscale response similar to that shown in FIG. 8 but with the improved FWHM of the sensor with increased segment length.

Referring to the advantage of isolation of spectral response arising from different segments of a multi-segment sensor as described in section [0223] above, even for the wider-segment designs of FIG. 21 and FIG. 22 (and other similar designs), if the narrow wavelength range is chosen such that:

$$\overline{\Delta\lambda} + \overline{\Delta\lambda} \leq \overline{\Delta\lambda} \, 2\overline{\Delta\lambda} - \overline{\Delta\lambda}$$

then the response of each segment may be isolated by windowing the segment in the delay-domain. The above relation is equivalent to saying that the narrow wavelength range is greater than the maximum spacing between any two neighboring spectral features, but less than twice this spacing (also accounting for spectral feature FWHM). Another equivalent statement is that the narrow wavelength range is sufficiently wide to always capture at least one spectral feature but no more than two. For the narrow wavelength range as defined above, due to the respective placement of segment couplets, no segments will overlap in the delay domain, and each segment may therefore be windowed to isolate its spectral response from that of its neighbors.

Figure 25:
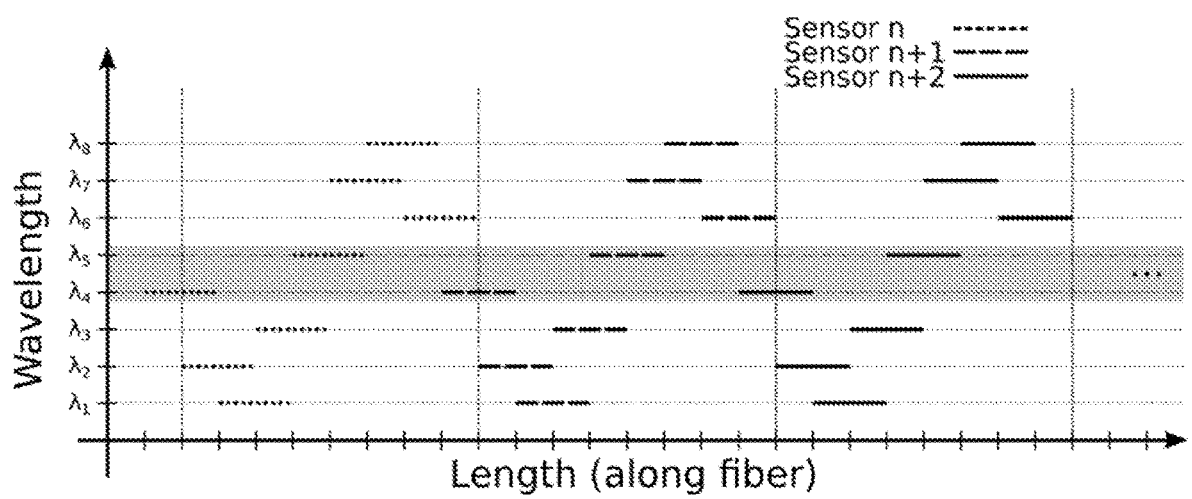
FIG. 25: Alternate embodiment of multi-segment FBG in which segment length is 2× the segment center-to-center spacing. An example narrow wavelength range that covers no more than two features at a time is shown by the gray horizontal bar. Due to the compact nature of this sensor and for this specific example, as the multi-feature spectral response moves up and down in wavelength with respect to the narrow wavelength range, in two extreme cases there is some overlap of segments in the delay-domain. An extra processing step may be used to differentiate the segments in the spectral—(i.e., wavelength-) domain. Once separated in the spectral domain, the segments may be clearly differentiated in the delay domain, and spacing between segments may be inferred. After this extra processing step, the same principles of (a) unique delay-domain segment spacing plus (b) relative location of spectral peaks, allow absolute identification of each spectral feature with knowledge only of the reduced-wavelength response. Each consecutive multi-segment sensor is shown in a different line style. Vertical dotted lines show multi-segment sensor center-to-center spacing $\Delta L_{sens}$.

1.5 Example Embodiment 5: Multi-Segment Sensor with Segment-Width to Segment-Spacing Ratio >1 and Consistent Segment Spacing FIG. 25 shows an alternative embodiment similar to that shown in FIG. 21 but in this embodiment the center-to-center spacing between neighboring segments at the low- and high-wavelength regions of the sensor is the same as the rest of the center-to-center segment spacing.

This embodiment allows for further reduction in overall multi-segment sensor length. In this case, for example for non-apodized fiber Bragg grating segments, the delay-domain representation will be the superposition of two rect functions. In the extreme low- and high-wavelength cases, the delay-domain representation will reflect a stair-step pattern as individual segment responses add together via the superposition principle. This stair-step pattern will be unique for each complementary pair of segment couplets, similar to the uniqueness of delay-domain pattern for each complementary pair of segment couplets as described in section 1.3.2.

Thus, appropriate pattern recognition algorithms may be employed to analyze the delay-domain patterns and determine the segment couplets. Given a narrow wavelength range that covers multiple segments that cannot be isolated in the delay-domain via simple windowing, an alternative technique may be employed to isolate the gratings. First, the region in the delay domain enclosing the segment couplets is inverse Fourier-transformed back to the spectral domain. In this domain, the response of the neighboring spectral features may be split halfway between the primary content of the features. Each subset of the data may then be transformed back to the delay domain to view the position of each segment individually. Thus, the center-to-center segment spacing may accurately be measured, the primary content of the spectral-domain features may accurately be independently analyzed, and remaining steps similar to those outlined in section [0168] may be utilized to obtain strain and or temperature profile from the series of multi-segment sensors.

1.6 Further Discussion

Those of ordinary skill in the art will recognize that FBG sensors may be differentiated based on other characteristics than those described in connection with the embodiments disclosed above. For example, FBG sensors may be differentiated based on shape of their spectral- or delay-domain response, functional form, and combinations thereof.

For example, consider mixing apodized and non-apodized gratings within the same multi-segment sensor. The non-apodized gratings will have functional form of a rect. Apodized gratings will have functional form similar to that of the apodization function. Gratings may thus be differentiated based on the delay-domain magnitude functional form.

Iterating functional form between spectrally-neighboring gratings would allow additional reliability in a system designed to cover only $\overline{\Delta\lambda} \approx \overline{\overline{\Delta\lambda}}$.

The magnitude delay-domain trace resulting from spatially-overlapping gratings may be functionally decomposed into individual response of different functional forms.

The term "substantially" in reference to a given parameter, property, or condition means and includes, to a degree, that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

It is to be understood that the features of the various embodiments described herein were not mutually exclusive and may exist in various combinations and permutations, even if such combinations or permutations were not made express herein, without departing from the scope of the disclosure. In fact, variations, modifications, and other implementations of what was described herein will occur to those of ordinary skill in the art without departing from the scope of the disclosure. As such, the invention is not to be defined only by the preceding illustrative description, but only by the claims which follow, and legal equivalents thereof.

Although each operation illustrated by or in connection with the figures and text recites acts performed in a particular order, embodiments of the present disclosure do not necessarily need to operate in that recited order. One of ordinary skill in the art would recognize many variations, including performing acts in parallel, or in a different order.

Additional embodiments are described, below and are part of this disclosure.

Embodiment 1

A multi-segment sensor system, the system comprising: a fiber; a light source configured to emit light at the fiber; and at least one sensor comprising a plurality of gratings having non-zero center-to-center segment spacing, the at least one sensor configured to exhibit at least two different spectral features over a wavelength range in response to the light source.

Embodiment 2

The system of Embodiment 1, wherein the two different spectral features correspond to a first wavelength and a second wavelength of the wavelength range of the at least one sensor, and wherein the first wavelength and the second wavelength are different.

Embodiment 3

The system of Embodiment 1, wherein the light source is configured to output wavelength swept light.

Embodiment 4

The system of Embodiment 1, wherein the at least two different spectral features are indicative of one or more of strain and temperature at the at least one sensor.

Embodiment 5

The system of Embodiment 1, further comprising a signal processor configured to detect the at least two different spectral features and measure a condition of the sensor.

Embodiment 6

A signal processing unit, the signal processing unit comprising circuitry configured to identify nominal wavelengths arising for known spectral features of at least one sensor on a fiber based on one or more of: a delay-domain absolute position of the at least one sensor; a delay-domain relative positions between the at least one sensor and another sensor; a delay-domain width of the respective at least one sensor; a delay-domain width differences between the at least one sensor and another sensor; and a spectral-domain/delay-domain ordering of the at least one sensor and another sensor.

Embodiment 7

The signal processing unit of Embodiment 6, wherein the signal processing unit is configured to receive an electrical signal.

Embodiment 8

The signal processing unit of Embodiment 6, wherein the signal processing unit is configured to receive an optical signal.

Embodiment 9

A wide dynamic range sensor system, the system comprising: a fiber; a swept light source configured to emit light at the fiber over a narrow wavelength range; at least one sensor comprising a first grating and a second grating configured to exhibit spectral features in response to the light at wavelengths within a wavelength range of the at least one sensor, wherein the first grating is configured to exhibit a first spectral feature at a first wavelength and second grating is configured to exhibit a second spectral feature at a second wavelength, wherein the first and second wavelengths are different; a signal processor configured to measure a condition of the sensor based on the first spectral feature and the second spectral feature.

Embodiment 10

A sensing unit, the sensing unit comprising: a first sensor comprising a plurality of sensor sub-units, wherein each sensor sub-unit of the plurality of the sensor sub-units is adapted to reflect light at a different narrow wavelength range compared to the other sensor sub-units of the plurality of sensor sub-units that is narrower than the wavelength range corresponding to the dynamic range of the first sensor; and a second sensor comprising a plurality of sensor sub-units, wherein each sensor sub-unit of the plurality of sensor sub-units is adapted to reflect light at a different narrow wavelength range compared to the other sensor sub-units of the plurality of sensor sub-units that is narrower than the wavelengths corresponding to the dynamic range of the second sensor.

Embodiment 11

The sensing unit of Embodiment 10, wherein a center-to-center spacing between the first sensor and second sensor is less than the width of the first and second sensor.

Embodiment 12

The sensing unit of Embodiment 10, wherein a center-to-center spacing between the first sensor and second sensor is equal to a width of the first and second sensor.

Embodiment 13

The sensing unit of Embodiment 10, wherein a center-to-center spacing between the first sensor and second sensor is greater than a width of the first and second sensor.

Embodiment 14

The sensing unit of Embodiment 10, wherein a center-to-center spacing between a first sensor sub-unit and a second sensor sub-unit is less than the width of the first and second sensor sub-unit.

Embodiment 15

The sensing unit of Embodiment 10, wherein a center-to-center spacing between a first sensor sub-unit and a second sensor sub-unit is equal to a width of the first and second sensor sub-unit.

Embodiment 16

The sensing unit of Embodiment 10, wherein a center-to-center spacing between a first sensor sub-unit and a second sensor sub-unit is greater than a width of the first and second sensor sub-unit.

Embodiment 17

A system for monitoring a device, the system comprising: a device under test; and an optical sensor or sensor system as claimed in Embodiments 1 through 14, the optical sensor configured to measure at least one of a strain and temperature of the device under test.

Embodiment 18

A system for monitoring a space, the system comprising: a space under test; and an optical sensor of one of the types claimed in Embodiments 1 through 15, the optical sensor configured to measure at least one of a strain and temperature of the device under test.

Embodiment 19

The system for monitoring a space of Embodiment 18, wherein the space is one of an oil well, a mine chamber, and a cavity in a human body.

Embodiment 20

A method of measuring strain on an optical sensor, the method comprising: detecting a first spectral feature characterized by a first wavelength; detecting a second spectral feature characterized by a second wavelength; detecting a shift of the first and second spectral features; and inferring a characteristic of the optical sensor based on the shift.

Embodiment 21

The method of Embodiment 20, wherein the determined characteristic is indicative of at least one of a strain and a temperature on the optical sensor based on the shift.

Embodiment 22

The method of Embodiment 20, wherein the strain is indicative of a strain of a device under test.

Embodiment 23

The method of Embodiment 20, wherein the first wavelength and the second wavelength are within a dynamic range of a sensor.

Embodiment 24

The method of Embodiment 20, further comprising determining a location of the inferred characteristic based on the first and second spectral features and a look up table.

Embodiment 25

The method of Embodiment 20, further comprising determining a location of the inferred characteristic based on one or more of: a delay-domain absolute position of the at least one sensor a delay-domain relative positions between the at least one sensor and another sensor; a delay-domain width of the respective at least one sensor; a delay-domain width differences between the at least one sensor and another sensor; and a spectral-domain/delay-domain ordering of the at least one sensor and another sensor.

Embodiment 26

The method of Embodiment 20, further comprising characterizing a device under test based on the inferred at least one characteristic.

Embodiment 27

The method of Embodiment 25, wherein the at least one sensor is a sensor sub-unit, and the other sensor is a sensor sub-unit.

Embodiment 28

A sensor system, the system comprising: a fiber; a light source configured to emit light at the fiber; and at least one sensor comprising a plurality of gratings having about zero center-to-center spacing and different widths, the at least one sensor configured to exhibit at least two different spectral features over a wavelength range in response to the light source.

What is claimed is:
1. An optical frequency-domain reflectometry (OFDR) sensor system, comprising:
   a fiber;
   a light source configured to inject laser light into the fiber, an interrogation wavelength of the laser light swept over an interrogation wavelength range; and
   at least one sensor having a response wavelength range in response to light provided to the at least one sensor, the response wavelength range correlated to a condition dynamic response wavelength range responsive to a condition of the fiber, the interrogation wavelength range of the laser light smaller than the response wavelength range of the at least one sensor, the at least one sensor comprising:
      a first sensor comprising a plurality of first sensor sub-units, each of the plurality of first sensor sub-units comprising a grating, each first sensor sub-unit of the plurality of first sensor sub-units adapted to reflect light at a first different narrow wavelength range compared to other first sensor sub-units of the plurality of first sensor sub-units, the first different narrow wavelength range narrower than the response wavelength range; and
      a second sensor comprising a plurality of second sensor sub-units, each of the plurality of second sensor sub-units comprising a grating, each second sensor sub-unit of the plurality of second sensor sub-units adapted to reflect light at a second different narrow wavelength range compared to other second sensor sub-units of the plurality of second sensor sub-units, the second different narrow wavelength range narrower than the response wavelength range;
   wherein the condition of the at least one sensor is inferred based, at least in part, on an optical time of flight delay domain reflectivity pattern arising from spectral features of reflections exhibited responsive to the laser light.

2. The OFDR sensor system of claim 1, wherein the interrogation wavelength range of the laser light is wide enough to cover spectral features corresponding to no more than two of the first sensor sub-units.

3. The OFDR sensor system of claim 1, wherein the optical time of flight delay domain reflectivity pattern is determined responsive to a delay domain position of a portion of the plurality of first sensor sub-units and of the plurality of second sensor sub-units that is within the interrogation wavelength range.

4. The OFDR sensor system of claim 1, wherein at least two different spectral features are indicative of one or more of strain and temperature at the at least one sensor.

5. The OFDR sensor system of claim 1, further comprising a signal processor configured to detect the optical time of flight delay domain reflectivity pattern and measure a condition of the sensor responsive to the optical time of flight delay domain reflectivity pattern.

6. An optical frequency-domain reflectometry (OFDR) sensor system, comprising:
   a sensing unit comprising at least one sensor including:
      a first sensor comprising a plurality of first sensor sub-units, wherein each first sensor sub-unit of the plurality of first sensor sub-units is adapted to reflect light at a first different narrow wavelength range compared to other first sensor sub-units of the plurality of first sensor sub-units, the first different narrow wavelength range narrower than a first response wavelength range corresponding to a first condition dynamic response wavelength range of the first sensor, the first condition dynamic response wavelength range responsive to a condition of a fiber including the at least one sensor; and
   a second sensor comprising a plurality of second sensor sub-units, wherein each second sensor sub-unit of the plurality of second sensor sub-units is adapted to reflect light at a second different narrow wavelength range compared to other second sensor sub-units of the plurality of second sensor sub-units, the second different narrow wavelength range narrower than a second response wavelength range corresponding to a second condition dynamic response wavelength range of the second sensor, the second condition dynamic response wavelength range responsive to the condition of the fiber; and a signal processing unit configured to;
  infer the condition of the sensing unit based, at least in part, on an optical time of flight delay domain reflectivity pattern of the at least one sensor exhibited responsive to laser light injected into the fiber, an interrogation wavelength of the laser light swept over an interrogation wavelength range that is smaller than the first response wavelength range and the second response wavelength range;
  identify nominal wavelengths arising for known spectral features of the at least one sensor in a fiber based, at least in part, on one or more of:
    a delay-domain absolute position of one or more sensor sub-units of the at least one sensor;
    a delay-domain relative positions between one sensor sub-unit and another sensor sub-unit of the at least one sensor;
    a delay-domain width of a respective sensor sub-unit of the at least one sensor;
    a delay-domain width difference between one sensor sub-unit and another sensor sub-unit of the at least one sensor; and
    a spectral-domain/delay-domain ordering of the sensor sub-units of the at least one sensor.

7. The OFDR sensor system of claim 6, wherein the signal processing unit is configured to receive an electrical signal representative of reflections received responsive to the laser light.

8. The OFDR sensor system of claim 6, wherein the signal processing unit is configured to receive an optical signal representative of reflections received responsive to the laser light.

9. A wide dynamic range optical frequency-domain reflectometry (OFDR) sensor system, comprising:
  a fiber;
  a swept light source configured to inject laser light into the fiber, the laser light swept over an interrogation wavelength range;
  at least one sensor having a response wavelength range in response to light provided to the at least one sensor, the interrogation wavelength range smaller than the response wavelength range, the at least one sensor further comprising:
    a first sensor comprising a plurality of first sensor sub-units, each of the plurality of first sensor sub-units comprising a grating, each first sensor sub-unit of the plurality of first sensor sub-units adapted to reflect light at a first different narrow wavelength range compared to other first sensor sub-units of the plurality of first sensor sub-units, the first different narrow wavelength range narrower than the response wavelength range; and
    a second sensor comprising a plurality of second sensor sub-units, wherein each second sensor sub-unit of the plurality of second sensor sub-units is adapted to reflect light at a second different narrow wavelength range compared to other second sensor sub-units of the plurality of second sensor sub-units, the second different narrow wavelength range narrower than the response wavelength range; and
  a signal processor configured to measure a condition of the sensor based, at least in part, on an optical time of flight delay domain reflectivity pattern arising from spectral features exhibited responsive to the laser light.

10. A sensing unit for an optical frequency-domain reflectometry (OFDR) sensor system the sensing unit, comprising:
  a first sensor comprising a plurality of first sensor sub-units, wherein each first sensor sub-unit of the plurality of first sensor sub-units is adapted to reflect light at a first different narrow wavelength range compared to other first sensor sub-units of the plurality of first sensor sub-units, the first different narrow wavelength range narrower than a first response wavelength range corresponding to a first condition dynamic response wavelength range of the first sensor, the first condition dynamic response wavelength range responsive to a condition of a fiber including the first sensor; and
  a second sensor comprising a plurality of second sensor sub-units, wherein each second sensor sub-unit of the plurality of second sensor sub-units is adapted to reflect light at a second different narrow wavelength range compared to other second sensor sub-units of the plurality of second sensor sub-units, the second different narrow wavelength range narrower than a second response wavelength range corresponding to a second condition dynamic response wavelength range of the second sensor, the second condition dynamic response wavelength range responsive to the condition of the fiber including the second sensor;
  wherein the condition of the fiber is inferred based, at least in part, on an optical time of flight delay domain reflectivity pattern arising from spectral features exhibited responsive to laser light, an interrogation wavelength of the laser light swept over an interrogation wavelength range, the interrogation wavelength range smaller than first response wavelength range and the second response wavelength range.

11. The sensing unit of claim 10, wherein a center-to-center spacing between the first sensor and second sensor is less than at least one of a first width of the first sensor and a second width of the second sensor.

12. The sensing unit of claim 10, wherein a center-to-center spacing between the first sensor and second sensor is equal to a width of the first sensor and the second sensor.

13. The sensing unit of claim 10, wherein a center-to-center spacing between the first sensor and second sensor is greater than a width of the first sensor and a width of the second sensor.

14. The sensing unit of claim 10, wherein a center-to-center spacing between a first sensor sub-unit and a second sensor sub-unit is less than a width of the first sensor sub-unit and the second sensor sub-unit.

15. The sensing unit of claim 10, wherein a center-to-center spacing between a first sensor sub-unit and a second sensor sub-unit is equal to a width of the first sensor sub-unit and the second sensor sub-unit.

16. The sensing unit of claim 10, wherein a center-to-center spacing between a first sensor sub-unit and a second sensor sub-unit is greater than a width of the first sensor sub-unit and the second sensor sub-unit.

17. A method of measuring spectral shift of an optical frequency-domain reflectometry (OFDR) optical sensor, the method comprising:
  detecting, responsive to laser light from a swept laser, an interrogation wavelength of the laser light swept over an interrogation wavelength range, a first spectral feature characterized by a first wavelength, the first spectral feature corresponding to a first sensor sub-unit of the OFDR optical sensor, the first sensor sub-unit adapted to reflect light at a first different narrow wavelength range compared to other sensor sub-units of the OFDR optical sensor, the first different narrow wavelength range narrower than a response wavelength range corresponding to a condition dynamic response wavelength range of the OFDR optical sensor;

detecting, responsive to the laser light, a second spectral feature characterized by a second wavelength, the second spectral feature corresponding to a second sensor sub-unit of the OFDR optical sensor, the second sensor sub-unit adapted to reflect light at a second different narrow wavelength range compared to the other sensor sub-units, the second different narrow wavelength range narrower than the response wavelength range, the interrogation wavelength smaller than the response wavelength range;

detecting a shift of one or more of the first or second spectral features; and inferring a characteristic of the optical sensor based, at least in part, on an optical time of flight delay domain reflectivity pattern arising from spectral features exhibited responsive to the laser light.

18. The method of claim 17, wherein the spectral shift is indicative of a strain on the optical sensor, a temperature on the optical sensor, or any effect on the optical sensor that is transduced to one of strain or temperature.

19. The method of claim 17, wherein the spectral shift is indicative of a device under test experiencing strain.

20. The method of claim 17, wherein the first wavelength and the second wavelength are within the condition dynamic response wavelength range of the OFDR optical sensor, the condition dynamic response wavelength range responsive to a condition of a fiber including the OFDR optical sensor.

21. The method of claim 17, further comprising determining a location of the inferred characteristic based on the first and second spectral features and a look up table.

22. The method of claim 17, further comprising determining a location of the inferred characteristic based on one or more of:

a delay-domain absolute position of one or more sensor sub-units of at least one OFDR optical sensor;

a delay-domain relative positions between one sensor sub-unit and another sensor sub-unit of the at least one OFDR optical sensor;

a delay-domain width of a respective sensor sub-unit of the at least one OFDR optical sensor;

a delay-domain width difference between one sensor sub-unit and another sensor sub-unit of the at least one OFDR optical sensor; and a spectral-domain/delay-domain ordering of sensor sub-units of the at least one OFDR optical sensor.

23. The method of claim 22, wherein the at least one sensor is a sensor sub-unit, and the other sensor is a sensor sub-unit.

24. The method of claim 17, further comprising characterizing a device under test based on the inferred characteristic.

25. An orthogonal frequency-domain reflectometry (OFDR) sensor system, comprising:

a fiber;

a light source configured to inject laser light into the fiber, an interrogation wavelength of the laser light swept over an interrogation wavelength range; and at least one sensor comprising a plurality of gratings having about zero center-to-center spacing and different widths, the at least one sensor having a response wavelength range in response to light provided to the at least one sensor, the response wavelength range correlated to a condition dynamic response wavelength range responsive to a condition of the fiber, the interrogation wavelength range of the laser light smaller than the response wavelength range of the at least one sensor, the at least one sensor further comprising:

a first sensor comprising a plurality of first sensor sub-units, wherein each first sensor sub-unit of the plurality of first sensor sub-units is adapted to reflect light at a first different narrow wavelength range compared to other first sensor sub-units of the plurality of first sensor sub-units, the first different narrow wavelength range narrower than a first response wavelength range corresponding to a first condition dynamic response wavelength range of the first sensor; and a second sensor comprising a plurality of second sensor sub-units, wherein each second sensor sub-unit of the plurality of second sensor sub-units is adapted to reflect light at a second different narrow wavelength range compared to other second sensor sub-units of the plurality of second sensor sub-units, the second different narrow wavelength range narrower than a second response wavelength range corresponding to a second condition dynamic response wavelength range of the second sensor;

wherein the condition of the fiber is inferred based, at least in part, on an optical time of flight delay domain reflectivity pattern arising from spectral features of reflections exhibited responsive to the laser light.

* * * * *